US011711627B2

(12) United States Patent
Song et al.

(10) Patent No.: US 11,711,627 B2
(45) Date of Patent: Jul. 25, 2023

(54) IMAGE CAPTURE DISPLAY TERMINAL

(71) Applicant: HONOR DEVICE CO., LTD., Guangdong (CN)

(72) Inventors: Kaikai Song, Shenzhen (CN); Ying Wang, Shenzhen (CN); Chen Zhu, Shenzhen (CN); Zhi Chang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 23 days.

(21) Appl. No.: 17/628,175

(22) PCT Filed: Jul. 20, 2020

(86) PCT No.: PCT/CN2020/102911
§ 371 (c)(1),
(2) Date: Jan. 18, 2022

(87) PCT Pub. No.: WO2021/013113
PCT Pub. Date: Jan. 28, 2021

(65) Prior Publication Data
US 2022/0264037 A1      Aug. 18, 2022

(30) Foreign Application Priority Data
Jul. 23, 2019  (CN) .......................... 201910667438.8

(51) Int. Cl.
*H04N 25/60*    (2023.01)
*H04N 23/60*    (2023.01)
(Continued)

(52) U.S. Cl.
CPC .......... *H04N 25/60* (2023.01); *H04M 1/0264* (2013.01); *H04M 1/72448* (2021.01);
(Continued)

(58) Field of Classification Search
CPC .... H04N 25/60; H04N 25/745; H04N 23/665; H04N 23/45; H04N 23/54; H04N 23/57;
(Continued)

(56) References Cited

U.S. PATENT DOCUMENTS 8,009,200 B2   8/2011   Goh et al.
8,896,668 B2   11/2014  Goma et al.
(Continued)

FOREIGN PATENT DOCUMENTS

CN    102263904 A    11/2011
CN    106534647 A    3/2017
(Continued)

*Primary Examiner* — Twyler L Haskins
*Assistant Examiner* — Akshay Trehan
(74) *Attorney, Agent, or Firm* — Fish & Richardson P.C.

(57) ABSTRACT

The control module outputs a control signal to control the first image capture module and the second image capture module to be in a working state in a time-sharing manner. A first signal interface is electrically connected to the first node. The first optimization unit is electrically connected between the first node and the first image capture module, and the second optimization unit is electrically connected between the first node and the second image capture module. The first optimization unit is configured to ensure the smoothness of a curve of a first image signal corresponding to a first image captured when the first image capture module is in the working state, and the second optimization unit is configured to ensure the smoothness of a curve of a second image signal corresponding to a second image captured when the second image capture module is in the working state.

15 Claims, 16 Drawing Sheets

(51) Int. Cl.
| | |
|---|---|
| *H04M 1/02* | (2006.01) |
| *H04M 1/72448* | (2021.01) |
| *H04M 1/72454* | (2021.01) |
| *H04N 23/45* | (2023.01) |
| *H04N 23/54* | (2023.01) |
| *H04N 23/57* | (2023.01) |
| *H04N 23/667* | (2023.01) |
| *H04N 25/71* | (2023.01) |
| *H04M 1/72403* | (2021.01) |

(52) U.S. Cl.
CPC ........ *H04M 1/72454* (2021.01); *H04N 23/45* (2023.01); *H04N 23/54* (2023.01); *H04N 23/57* (2023.01); *H04N 23/665* (2023.01); *H04N 23/667* (2023.01); *H04N 25/745* (2023.01); *H04M 1/72403* (2021.01); *H04M 2250/12* (2013.01); *H04M 2250/52* (2013.01)

(58) Field of Classification Search
CPC .............. H04N 23/667; H04M 1/0264; H04M 1/72448; H04M 1/72454; H04M 1/72403; H04M 2250/12; H04M 2250/52; G06F 1/1686; G06F 1/1605
See application file for complete search history.

(56) References Cited

U.S. PATENT DOCUMENTS

| | | | |
|---|---|---|---|
| 9,497,380 | B1 | 11/2016 | Jannard |
| 9,787,918 | B2 | 10/2017 | De Groot |
| 10,142,548 | B2 | 11/2018 | Olsen et al. |
| 2008/0218612 | A1* | 9/2008 | Border ................ G03B 13/36 348/262 |
| 2011/0242356 | A1* | 10/2011 | Aleksic ............... H04N 13/161 348/222.1 |
| 2013/0021447 | A1* | 1/2013 | Brisedoux ........... H04N 23/741 348/241 |
| 2016/0212456 | A1 | 7/2016 | Bohm et al. |
| 2018/0089808 | A1* | 3/2018 | Ling .................... H04N 23/64 |
| 2022/0264037 | A1 | 8/2022 | Song et al. |

FOREIGN PATENT DOCUMENTS

| | | |
|---|---|---|
| CN | 106791327 A | 5/2017 |
| CN | 108540697 A | 9/2018 |
| CN | 110392149 A | 10/2019 |
| RU | 2570354 C2 | 12/2015 |

* cited by examiner

IMAGE CAPTURE DISPLAY TERMINAL

CROSS-REFERENCE TO RELATED APPLICATIONS

This application is a national stage of International Application No. PCT/CN2020/102911, filed on Jul. 20, 2020, which claims priority of Chinese Patent Application No. 201910667438.8, filed on Jul. 23, 2019. Both of the applications are hereby incorporated by reference in their entireties.

TECHNICAL FIELD

Embodiments of this application relate to the field of image processing technologies, and in particular, to an image capture display terminal.

BACKGROUND

With the improvement in users' demand for image quality, electronic terminals generally adopt two or more camera modules such as high-definition cameras to capture images at the same time, so as to achieve a better shooting effect and meet users' requirements for image quality. However, the increase in a quantity of camera modules also leads to the increase in quantities of required components and connection lines between the camera modules and an image processing module, which affects an occupied board space and the wiring complexity of a circuit board.

SUMMARY

To resolve the foregoing technical problems, the present invention provides an image capture display terminal, to reduce the impact on an occupied board space of a circuit board.

An image capture display terminal is provided, including an image capture switching module configured to switch different image capture modules. The image capture switching module includes a control module, a first optimization unit, a second optimization unit, a first image capture module, a second image capture module, and a first node. The control module includes a first control bus and a first signal interface, the control module is electrically connected to the first image capture module and the second image capture module by using the first control bus, and the control module outputs a control signal to control the first image capture module and the second image capture module to be in a working state in a time-sharing manner. The first signal interface is electrically connected to the first node. The first optimization unit is electrically connected to the first node and the first image capture module, and the second optimization unit is electrically connected to the first node and the second image capture module. The first image capture module is configured to capture a first image and output a first image signal, and the second image capture module is configured to capture a second image and output a second image signal. The first image signal corresponding to the captured first image is transmitted to the first signal interface by using the first optimization unit when the first image capture module is in the working state under the control of the control signal, and the first optimization unit is configured to ensure the smoothness of a curve of the first image signal. The second image signal corresponding to the captured second image is transmitted to the first signal interface by using the second optimization unit when the second image capture module is in the working state under the control of the control signal, and the second optimization unit is configured to ensure the smoothness of a curve of the second image signal.

The control module can directly control a working state of the first image capture module or the second image capture module by using a control bus. In addition, a signal interface configured to transmit image signals provided by different image capture modules is effectively saved by sharing the first signal interface, and there is completely no need to set an analog transfer switch separately for a working state of the first image capture module or the second image capture module, which effectively reduces quantities of components and wires on a circuit board, simplifies a structure of the circuit board, and provides more layout space for setting other functional components.

In an embodiment of this application, that the control module controls the first image capture module and the second image capture module to be in a working state in a time-sharing manner includes: when the first image capture module is in the working state, the second image capture module is in a non-working state, and when the first image capture module is in the working state, the second image capture module is in the non-working state. When the first image capture module is in the working state, that is, the first image capture module is in a high speed low resistance mode to capture a first image signal and transmits the first image signal from the first signal interface to the control module, and the second image capture module is in the non-working state, that is, the second image capture module is in a low power high resistance mode, the second image capture module stops capturing the second image. When the second image capture module is in the working state, that is, the second image capture module is in the high speed low resistance mode, and the first image capture module is in the non-working state, that is, the first image capture module is in the low power high resistance mode, the second image capture module captures a second image signal and transmits the second image signal from the first signal interface to the control module, and the first image capture module stops capturing the first image.

When the first image capture module is in the low power high resistance mode, an impedance of the first image capture module is greater than 100Ω; and when the second image capture module is in the low power high resistance mode, an impedance of the second image capture module is greater than 100Ω. Because an impedance of an image capture module in a non-working state is greater than 100Ω, signal interference to an image capture module in a working state can be effectively reduced to ensure the quality of an image signal.

In an embodiment of this application, when the first image capture module is in the high speed low resistance mode and the second image capture module is in the low power high resistance mode, the first optimization unit specifically eliminates a ringback of the first image signal to ensure the smoothness of a curve of the first image signal. When the second image capture module is in the high speed low resistance mode and the first image capture module is in the low power high resistance mode, the second optimization unit specifically eliminates a ringback of the second image signal to ensure the smoothness of a curve of the second image signal. The first optimization unit and the second optimization unit can effectively eliminate a ringback and noise generated by an image capture module in a non-working state on a curve of an image signal for an image capture module in a working state because of wire stubs.

In an embodiment of this application, the first optimization unit includes first resistors, and the second optimization unit includes second resistors. The first resistors are electrically connected to the control module by using the first node, and the second resistors are electrically connected to the control module by using the first node.

A distance from the first node to the control module is greater than a distance from the first node to the first image capture module; or a distance from the first node to the control module is greater than a distance from the first node to the second image capture module. The first node, the first optimization unit, and the second optimization unit are disposed as close to the image capture modules as possible, to effectively reduce the impact of the wire stubs.

In an embodiment of this application, the first image capture module and the second image capture module are arranged abreast on a first straight line, the first straight line is parallel to the control module, and the first node is located on the first straight line or the first node is located between the first straight line and the control module. Therefore, a distance from the first node to the first image capture module and a distance from the first node to the second image capture module are relatively small, further reducing the impact of the wire stubs.

In an embodiment of this application, the first optimization unit further includes first inductors, and the first inductors are serially connected between the first resistors and the first image capture module. The second optimization unit further includes second inductors, and the second inductors are serially connected between the second resistors and the second image capture module. The first inductors are configured to filter noise of the first image signal; and the second inductors are configured to filter noise of the second image. Therefore, it is further ensured that image signals provided to the control module are integral, accurate, and relatively good in quality.

In an embodiment of this application, the first signal interface includes a clock signal interface and a data signal interface, the clock signal interface is configured to receive a clock control signal in the first image signal or the second image signal, and the data signal interface is configured to receive image data in the first image signal or the second image signal. The clock signal interface includes a pair of clock differential pair interfaces, and the pair of clock differential pair interfaces is electrically connected to the first node. The data signal interface includes a pair of data differential pair interfaces, and the pair of data differential interfaces is electrically connected to the first node.

Specifically, the first optimization unit includes four first resistors, and the four first resistors are electrically connected to the first node and the first image capture module respectively corresponding to the clock differential pair interfaces and the data differential pair interfaces. The second optimization unit includes four second resistors, and the four second resistors are electrically connected to the first node and the second image capture module respectively corresponding to the clock differential pair interfaces and the data differential pair interfaces.

In an embodiment of this application, the first optimization unit specifically further includes four first inductors, and the four first inductors are electrically connected between the four first resistors and the first image capture module respectively. The second optimization unit specifically further includes four second inductors, and the four second inductors are electrically connected between the four second resistors and the second image capture module respectively.

Each interface in the shared clock differential interfaces and data differential pair interfaces in the first signal interface is provided with a resistor and an inductor for optimizing an image signal, thereby ensuring that image signals transmitted and received by each interface have interference eliminated as far as possible, and keep integral, accurate, and relatively good in quality.

In an embodiment of this application, the first optimization unit further includes two first common-mode inductors, each of the first common-mode inductors includes two first sub-inductors, and one of the first resistors is serially connected to one of the first sub-inductors. The second optimization unit further includes two second common-mode inductors, each of the second common-mode inductors includes two second sub-inductors, and one of the first resistors is serially connected to one of the second sub-inductors. Two of the first resistors and one of the first common-mode inductors are serially connected, and electrically connected between the first node and the first image capture module corresponding to the clock differential pair interfaces, and two of the second resistors and one of the second common-mode inductors are serially connected, and electrically connected between the first node and the second image capture module corresponding to the clock differential pair interfaces. The other two of the first resistors and the other one of the first common-mode inductors are serially connected, and electrically connected between the first node and the first image capture module corresponding to the data differential pair interfaces, and the other two of the second resistors and the other one of the second common-mode inductors are serially connected, and electrically connected between the first node and the second image capture module corresponding to the data differential pair interfaces.

Because of the high degree of integration of the common-mode inductors, the wiring complexity can be simplified and the wiring efficiency can be improved while noise of the image signal is eliminated.

In an embodiment of this application, the first node is separated from the first image capture module by a first distance; the first node is separated from the second image capture module by a second distance; and the first distance is the same as the second distance, the first resistors and the second resistors have the same resistance value, and the first inductors and the second inductors have the same inductance value. The distance from the first node to the first image capture module and the distance from the first node to the second image capture module are the same, and the first image capture module and the second image capture module have the same component size and parameter, so that effects of impact of the wire stubs between the first node and the first image capture module and between the first node and the second image capture module are the same, to further ensure that image signals transmitted from the first node to the control module have relatively good consistency under the condition of relatively low interference.

Specifically, when the first distance and the second distance are 10 mm, the resistance values of the first resistors and the second resistors are the same and are 10Ω, and the inductance values of the first inductors and the second inductors are 27 nH.

In an embodiment of this application, the first node is separated from the first image capture module by a first distance, the second node is separated from the second image capture module by a second distance, and the first distance is different from the second distance. The resistance values of the first resistors and the second resistors are the same, and the inductance values of the first inductors and the second inductors are different. When the distance from the first node to the first image capture module and the distance from the first node to the second image capture module are different, parameters of the resistors and the inductors in the first optimization unit and the second optimization unit are also configured to be different correspondingly, to eliminate different degrees of interference and noise caused by different parameters of the wire stubs, and to ensure that the image signals have relatively low interference and relatively good consistency.

Specifically, the first distance is 10 mm, the second distance is 35 mm, the resistance values of the first resistors and the second resistors are the same and are 10Ω, the inductance value of the first inductor is 27 nH, and the inductance value of the second inductor is 15 nH.

In an embodiment of this application, the image capture switching control module further includes a third image capture module, a second node, and a third optimization unit. The third image capture module is electrically connected to the control module by using the control bus and configured to capture a third image to obtain a third image signal, and the control module controls the first image capture module, the second image capture module, and the third image capture module to be in the working state in the time-sharing manner. The second optimization unit is electrically connected between the first node and the second node, the second image capture module is electrically connected to the second node by using the third optimization unit, and the third image capture module is electrically connected to the second node by using the third optimization unit. The second optimization unit and the third optimization unit are configured to eliminate the ringback and noise of the second image signal to ensure the smoothness of the curve of the second image signal. The second optimization unit and the third optimization unit are configured to eliminate a ringback and noise of the third image signal to ensure the smoothness of a curve of the third image signal. When a quantity of image capture modules is increased, quantities of corresponding nodes and optimization units are also increased correspondingly, which effectively ensures that images captured by using different image capture modules and corresponding image signals can share the same signal interface and be transmitted to the control module accurately and with high quality.

In an embodiment of this application, the third optimization unit includes a first optimization subunit and a second optimization subunit, the second image capture module is electrically connected to the second node by using the first optimization subunit, and the third image capture module is electrically connected to the second node by using the second optimization subunit. The second optimization unit and the first optimization subunit are configured to eliminate the ringback and the noise of the second image signal. The second optimization unit and the second optimization subunit are configured to eliminate the ringback and the noise of the third image signal.

For the second image capture module and the third image capture module, the first optimization subunit and the second optimization subunit are respectively correspondingly configured to perform optimization operations such as ringback eliminating and noise filtering on the image signals obtained by the second image capture module and the third image capture module, to further accurately ensure that the image signals provided to the control module are integral, accurate, and relatively good in quality.

In an embodiment of this application, the second resistors included in the second optimization unit are electrically connected between the first node and the second node. The first optimization subunit includes third resistors and second inductors, and the third resistors and the second inductors are serially connected between the second node and the second image capture module. The second optimization subunit includes fourth resistors and third inductors, and the fourth resistors and the third inductors are serially connected between the second node and the third image capture module. Parameters of the resistors and the inductors in the first optimization subunit and the second optimization subunit are respectively used for performing ringback eliminating and noise filtering, and coordinating to ensure that the image signals are integral and accurate.

In an embodiment of this application, the clock signal interface is further configured to receive a clock control signal in the third image signal, and the data signal interface is further configured to receive image data in the third image signal. The second optimization unit includes four second resistors, and the four second resistors are serially and electrically connected between the first node and the second node corresponding to the pair of clock differential pair interfaces and the pair of data differential pair interfaces. The first optimization subunit includes four third resistors and four second inductors, and the four third resistors and the four second inductors are serially and electrically connected between the second node and the second image capture module respectively in one-to-one correspondence corresponding to the pair of clock differential pair interfaces and the pair of data differential pair interfaces. The second optimization subunit includes four fourth resistors and four third inductors, and the four fourth resistors and the four third inductors are serially and electrically connected between the second node and the third image capture module respectively in one-to-one correspondence corresponding to the pair of clock differential pair interfaces and the pair of data differential pair interfaces.

For the second image capture unit and the third image capture unit, each interface in the shared differential pair in the first signal interface is provided with a resistor and an inductor for optimizing an image signal, thereby ensuring that image signals transmitted and received by each interface have interference eliminated as far as possible, and keep integral, accurate, and relatively good in quality.

In an embodiment of this application, the first node is separated from the first image capture module by a first distance, the second node is separated from the second image capture module by a second distance, and the second node is separated from the third image capture module by a third distance. The first distance is different from the second distance and the third distance. Resistance values of the first resistors and the second resistors are the same, and resistance values of the second resistors and the third resistors are different. Resistance values of the third resistors and the fourth resistors are the same, and inductance values of the first inductors are different those of the second inductors and the third inductors. The second distance and the third distance are the same, and the inductance values of the second inductors and the third inductors are the same.

The distance from the second node to the second image capture module and the distance from the second node to the third image capture module are the same, and the second image capture module and the third image capture module have the same component size and parameter, so that effects of impact of the wire stubs between the second node and the second image capture module and between the second node and the third image capture module are the same, to further ensure that image signals transmitted from the first node and the second node to the control module have relatively good consistency under the condition of relatively low interference.

Specifically, the first distance is 10 mm, and a sum of the second distance and the third distance is 35 mm. The resistance values of the first resistors and the second resistors are the same and are 22Ω, the resistance values of the third resistors and the fourth resistors are 10Ω, the inductance value of the first inductor is 18 nH, and the inductance value of the second inductor is 9 nH.

In an embodiment of this application, the image capture display terminal further includes a display module, and the control module further includes a second signal interface, a second control bus, and a third node. The third node is electrically connected to the second signal interface. The third node is electrically connected to the second signal interface. The display module includes a first display unit and a second display unit, the first display unit and the second display unit are configured to perform image display, and the first display unit and the second display unit are electrically connected to the second signal interface by using the second node. The control module is electrically connected to the first display unit and the second display unit by using the second control bus, and the control module transmits an image signal to the first display unit and the second display unit by using the second signal interface in a time-sharing manner.

Therefore, when displaying an image, the control module in the image capture display terminal can share a signal interface used for outputting an image signal, which effectively improves the utilization rate of the signal interface on the control module.

In an embodiment of this application, the control module is a system on chip, the first signal interface is a camera serial interface in a mobile industry processor interface, and the second signal interface is a display serial interface in the mobile industry processor interface.

In an embodiment of this application, the image capture display terminal further includes a fourth optimization unit and a fifth optimization unit. The fourth optimization unit is electrically connected to the second signal interface and the first display unit by using the third node. The fifth optimization unit is electrically connected to the second signal interface and the second display unit by using the third node. The fourth optimization unit is electrically connected between the third node and the first display unit and configured to eliminate a ringback and noise of a received image signal. The fifth optimization unit is electrically connected between the third node and the second display unit and configured to eliminate a ringback and noise of a received image signal.

In an embodiment of this application, the image capture display terminal further includes a touch module, and the touch module is electrically connected to the control module and configured to receive a touch operation and recognize position information of the touch operation. The position information represents an image capture module or display unit required to be in a working state. The control module outputs, according to the position information, a control signal to the first image capture module and the second image capture module, or a control signal to the first display unit and the second display unit, to control working states of the first image capture module and the second image capture modules, or working states of the first display unit and the second display unit.

In an embodiment of this application, the image capture display terminal further includes an audio pickup module, and the audio pickup module is electrically connected to the control module and configured to receive a touch operation and recognize an audio signal. The audio information represents an image capture module or display unit required to be in a working state. The control module outputs, according to the audio information, a control signal to the first image capture module and the second image capture module, or a control signal to the first display unit and the second display unit, to control working states of the first image capture module and the second image capture modules, or working states of the first display unit and the second display unit.

A user can select an image capture module and a display unit according to actual requirements of the user by using the touch module or the audio pickup module, which effectively improves flexibility of the user in controlling a plurality of image capture modules and a plurality of display units.

In an embodiment of this application, an image capture display terminal is provided, including a control module, a first optimization unit, a second optimization unit, a first image capture module, a second image capture module, and a first node. The control module includes a first control bus and a first signal interface, the control module is electrically connected to the first image capture module and the second image capture module by using the first control bus, and the control module outputs a control signal to control the first image capture module and the second image capture module to be in a working state in a time-sharing manner.

The first signal interface includes a clock signal interface and a data signal interface, the clock signal interface is configured to receive a clock control signal in a first image signal or a second image signal, and the data signal interface is configured to receive image data in the first image signal or the second image signal. The clock signal interface includes a pair of clock differential pair interfaces, and the pair of clock differential pair interfaces is electrically connected to the first node. The data signal interface includes a pair of data differential pair interfaces, and the pair of data differential interfaces is electrically connected to the first node.

The pair of clock differential pair interfaces and the data signal interfaces in the first signal interface are electrically connected to four child nodes in the first node respectively.

The first optimization unit is electrically connected to the first node and the first image capture module, and the first optimization unit includes four first resistors and four first inductors. The second optimization unit is electrically connected to the first node and the second image capture module, and the second optimization unit includes four second resistors and four second inductors. The four first resistors are electrically connected between the four child nodes and the first image capture module respectively corresponding to the clock differential pair interfaces and the data differential pair interfaces. The four second resistors are electrically connected between the four child nodes and the first image capture module respectively corresponding to the clock differential pair interfaces and the data differential pair interfaces.

The first image capture module is configured to capture a first image signal, and the second image capture module is configured to capture a second image signal. The captured first image signal is transmitted to the first signal interface by using the first optimization unit when the first image capture module is in the working state, the first resistor is configured to eliminate a ringback of the first image signal to ensure the smoothness of a curve of the first image signal, and the first inductor is configured to filter noise of the first image signal. The captured second image signal is transmitted to the first signal interface by using the second optimization unit when the second image capture module is in the working state, the second resistor is configured to eliminate a ringback of the second image signal to ensure the smoothness of a curve of the first image signal, and the second inductor is configured to filter noise of the second image signal.

The control module can directly control a working state of the first image capture module or the second image capture module by using a control bus. In addition, a signal interface configured to transmit image signals provided by different image capture modules is effectively saved by sharing the first node and the first signal interface, and there is completely no need to set an analog transfer switch separately for a working state of the first image capture module or the second image capture module, which effectively reduces quantities of components and wires on a circuit board, simplifies a structure of the circuit board, and provides more layout space for setting other functional components.

DESCRIPTION OF EMBODIMENTS

Specific embodiments are used below to describe this application.

Figure 1A:
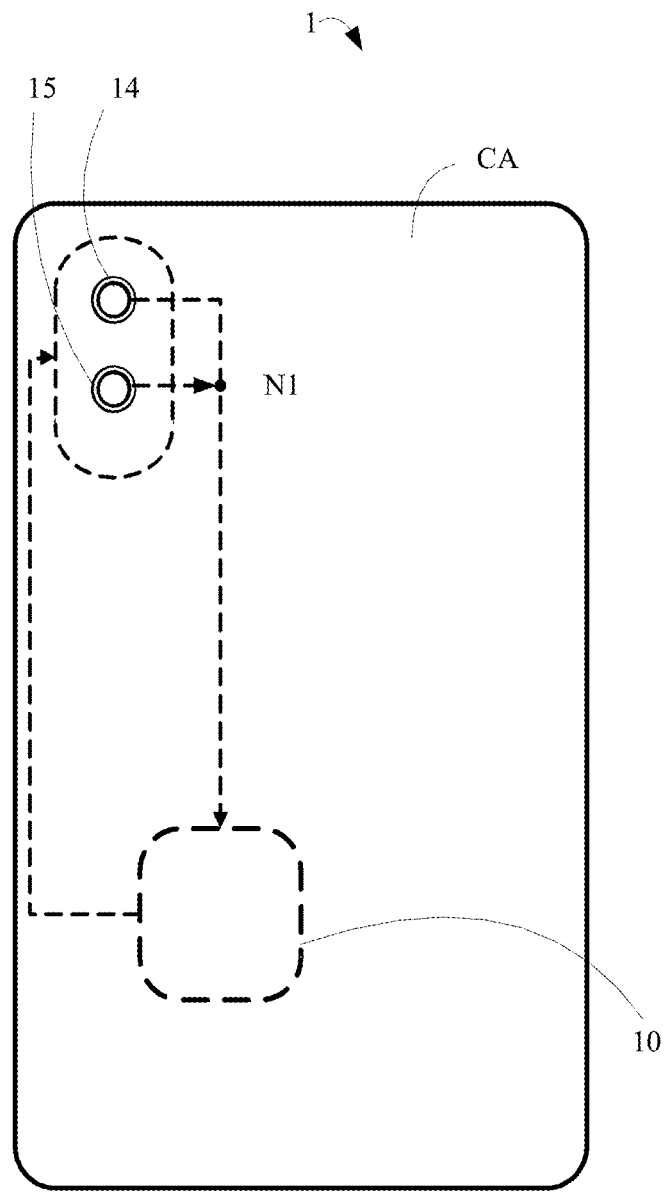
FIG. 1a and FIG. 1b are schematic diagrams of plane structures of two opposite sides of an image capture display terminal according to an embodiment of this application.
Figure 1B:
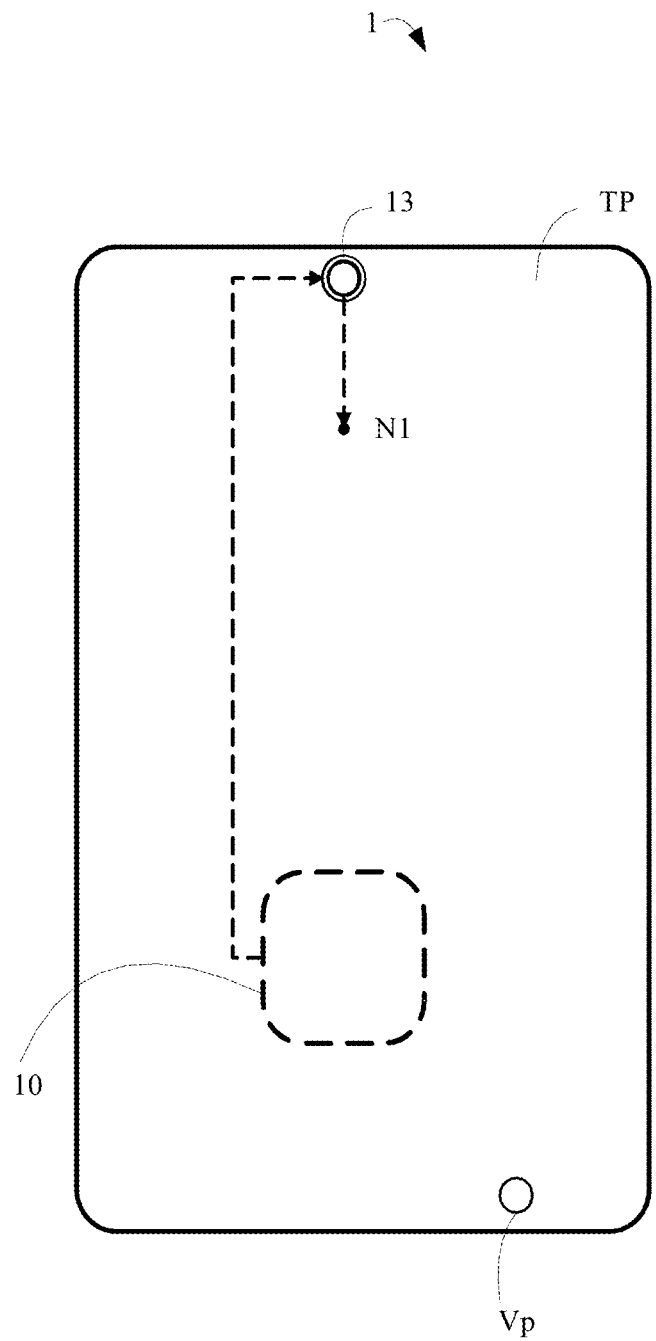

FIG. 1a and FIG. 1b are schematic diagrams of plane structures of two opposite sides of an image capture display terminal 1 according to an embodiment of this application. As shown in FIG. 1a and FIG. 1b, the image capture display terminal 1 is configured to perform image capture and image display. The image capture display terminal 1 includes a touch display screen TP and a first image capture module 13 located on one side, and a housing CA, a second image capture module 14, and a third image capture module 15 located on an opposite other side.

In this embodiment, when a user uses the image capture display terminal 1, one side provided with the touch display screen TP and the first image capture module 13 faces the user, and may be referred to as a front side of the image capture display terminal 1. One side provided with the housing CA, the second image capture module 14, and the third image capture module 15 has the back facing the user, and may be referred to as a back side of the image capture display terminal 1. In addition, on the side provided with the touch display screen TP, the image capture display terminal 1 further includes an audio pickup module VP and other functional modules (not shown), and the other functional modules may include an infrared sensor, an audio player, and the like.

The touch display screen 1a is configured to perform touch detection and image display. The touch display screen 1a includes a display module (not labeled) and a touch module (not labeled). The display module is configured to perform image display, and the touch module is configured to receive a touch operation and recognize a position of the touch operation. In this embodiment, the display module may be a liquid crystal display (LCD) module or an organic light-emitting diode (OLED) display module, and the touch module may be a capacitive touch module, an optical touch module, or the like.

The first image capture module 13, the second image capture module 14, and the third image capture module 15 are configured to perform image capture, save captured image data, and output the image data in an image signal manner. The first image capture module 13, the second image capture module 14, and the third image capture module 15 capture images of the image capture display terminal 1 in different directions separately. Meanwhile, the second image capture module 14 and the third image capture module 15 located on the same side of the image capture display terminal 1 can further have different image capture functions, for example, the second image capture module 14 is configured to obtain color images, and the third image capture module 15 is configured to capture monochrome images.

In this embodiment, the first image capture module 13, the second image capture module 14, and the third image capture module 15 are all electrically connected to a signal interface of a control module 10 by using a first node N1, that is, the first image capture module 13, the second image capture module 14, and the third image capture module 15 share a signal interface corresponding to the first node N1. The control module 10 outputs a control signal to the first image capture module 13, the second image capture module 14, and the third image capture module 15, to control the first image capture module 13, the second image capture module 14, and the third image capture module 15 to be in a working state in a time-sharing manner, that is, only one of the three modules transmits image data to the control module 10 by using the first node N1 at one moment.

Alternatively, in other embodiments (not shown) of this application, the first image capture module 13 and the second image capture module 14 are electrically connected to one signal interface of the control module 10 by using the first node N1, but the third image capture module 15 is electrically connected to another signal interface of the control module 10 directly, and is not required to share the same signal interface with the first image capture module 13 and the second image capture module 14 by using the first node N1.

Specifically, the first image capture module 13 and the second image capture module 14 share one signal interface corresponding to the first node N1. The control module 10 outputs a control signal to the first image capture module 13 and the second image capture module 14, to control the first image capture module 13 and the second image capture module 14 to be in a working state in a time-sharing manner, that is, only one of the two modules transmits image data to the control module 10 by using the first node N1 at one moment.

The third image capture module 15 is electrically connected to another signal interface of the control module 10 directly independent of the first node N1. In view of this, the third image capture module 15 is not required to share one signal interface with the first image capture module 13 and the second image capture module 14 to transmit an image signal to the control module 10. In this case, a working state of the third image capture module 15 under the control of the control signal outputted by the control module 10 is not limited by a quantity of signal interfaces. The third image capture module may be in the working state with one of the first image capture module 13 and the second image capture module 14 under the control of the control module 10 at the same time, or may be in the working state with neither the first image capture module 13 nor the second image capture module 14 under the control of the control module 10 at the same time.

The control signal outputted by the control module 10 is a digital logic signal outputted from a signal output interface of the control module 10. Alternatively, the control signal may be an analog voltage signal outputted by the control module 10 by using a signal interface.

Figure 2:
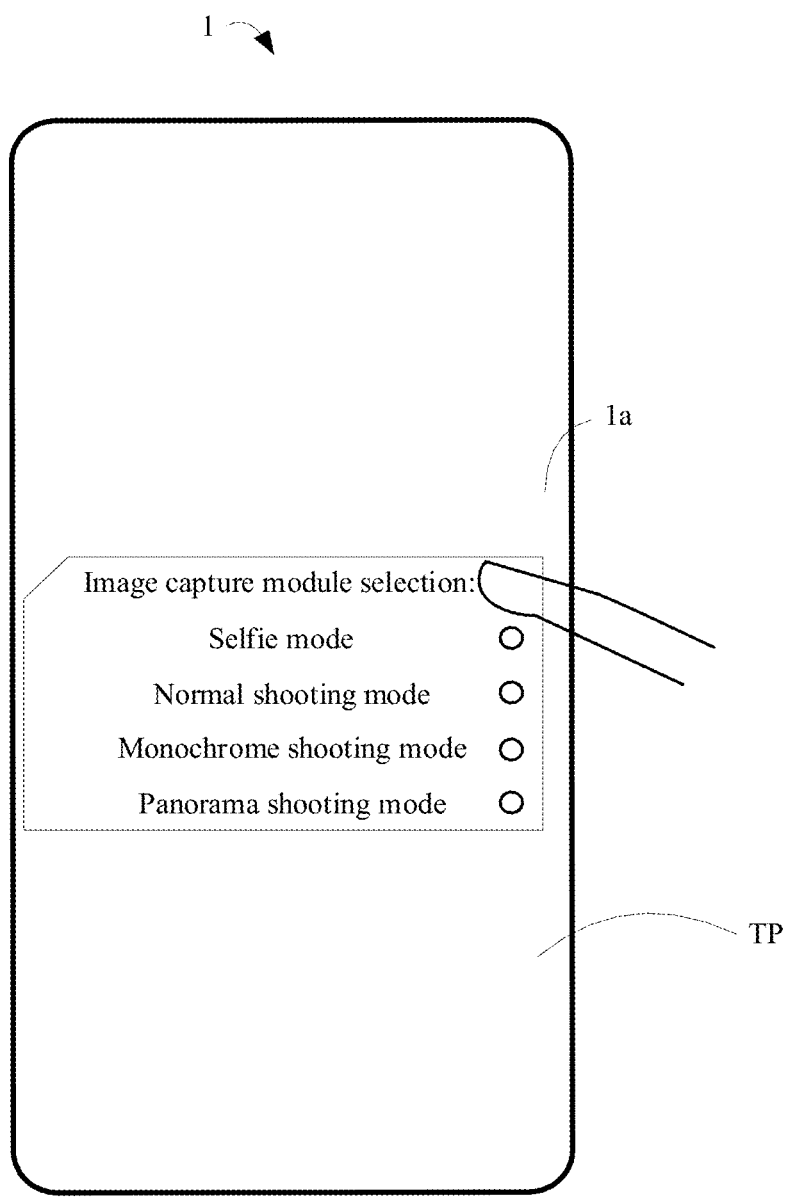
FIG. 2 is a schematic diagram of a manner of controlling working states of a plurality of image capture display modules shown in FIG. 1a and FIG. 1b.

FIG. 2 is a schematic diagram of a manner of controlling working states of a plurality of image capture display modules shown in FIG. 1a and FIG. 1b. As shown in FIG. 2, a manner of controlling working states of the first image capture module 13, the second image capture module 14, and the third image capture module 15 is mainly performed by the user according to an image capture mode selected by the user according to requirements that is received by the image capture display terminal 1.

Specifically, the touch display screen 1a displays an information prompt box, and the information prompt box includes options of a plurality of image capture modes for the user to select by using the touch operation: a selfie mode, a normal shooting mode, a monochrome shooting mode, and a panorama shooting mode. For example, the user may select one shooting mode in the foregoing four modes according to actual image shooting requirements.

When the user selects the selfie mode, the control module 10 outputs a control signal according to the mode to control the first image capture module 13 to be in a working state, and meanwhile control the second image capture module 14 and the third image capture module 15 to be in a non-working state. During this period, only the first image capture module 13 is in the working state. When the user selects the normal shooting mode, the control module 10 outputs a control signal according to the mode to control the second image capture module 14 to be in a working state, and meanwhile control the first image capture module 13 to be in a working state and the third image capture module 15 to be in a non-working state. During this period, only the second image capture module 14 is in the working state. When the user selects the monochrome shooting mode, the control module 10 outputs a control signal according to the mode to control the third image capture module 15 to be in a working state, and control the first image capture module 13 and the second image capture module 14 to be in a non-working state. During this period, only the third image capture module 15 is in the working state. When the user selects the panorama shooting mode, the control module 10 outputs a control signal according to the mode to control the second image capture module 14 and the third image capture module 15 to be both in a working state, and control the first image capture module 13 to be in a non-working state, so as to form a panoramic image by using images captured by the second image capture module 14 and the third image capture module 15 at the same time.

It should be noted that, regardless of whether being in the selfie mode, the normal shooting mode, the monochrome shooting mode, or the panorama shooting mode, merely one image capture module is in the working state at one moment to capture an image only when a plurality of capture modules share one signal interface. When an image capture module is independently connected to a signal interface of the control unit 10 and does not share one signal interface with other image capture modules to transmit an image signal, the image capture module is not required to be limited to being in a working state in a time-sharing manner, and can be in a working state or a non-working state according to a shooting mode selected by the user. In addition, an example in which the four modes displayed in the image capture display terminal 1 are only some image capture modes is used for description. The image capture display terminal 1 may further include a night shooting mode, a professional shooting mode, a time-lapse photography mode, a watermark shooting mode, a close-shot mode, and the like, and is not limited thereto.

The control module 10 further obtains an image module selected by the user for image capture according to position information of the touch operation received on the touch display screen 1a, and outputs a corresponding control signal to control the image capture module selected by the user for image capture. Other image capture modules are in the non-working state, and the image capture module performing the image capture transmits the obtained image data to the control module 10 by using a shared signal interface. The position information of the touch operation represents an image capture unit selected for image capture, for example, the first image capture module 13, the second image capture module 14, or the third image capture module 15 is selected for image capture.

Certainly, the working state of the plurality of image capture modules may alternatively be controlled according to input instructions provided by an external user by using a sound operation or other manners, or received instructions provided by other functional modules inside the terminal. The control signal may be a digital signal or an analog signal.

In this embodiment, the control module 10 is a system on chip (Soc), the signal interface shared in the control module 10 and configured to receive image data is a camera serial interface (CSI) in a mobile industry processor interface (MIPI).

In this embodiment, the first image capture module 13, the second image capture module 14, and the third image capture module 15 are cameras with the same resolution or different resolutions separately. For example, the first image capture module 13 is a 2 megapixel (2M resolution) camera, the second image capture module 14 is an 8 megapixel (8M resolution) camera, and the second image capture module 15 is an 8 megapixel (8M resolution) camera. In other embodiments of this application, resolutions and other image capture parameters of the first image capture module 13, the second image capture module 14, and the third image capture module 15 may alternatively be set according to actual requirements. For example, the first image capture module 13, the second image capture module 14, and the third image capture module 15 may alternatively select resolutions of 16 megapixels, 40 megapixels, and 32 megapixels, and are not limited thereto. In addition, a quantity of image capture modules included in the image capture display terminal 1 may also be adjusted according to actual requirements. For example, only such two image capture modules as the first image capture module 13 and the second image capture module 14 are disposed, or other image capture modules with different resolutions, focal lengths, and other image capture parameters may be added.

Figure 3:
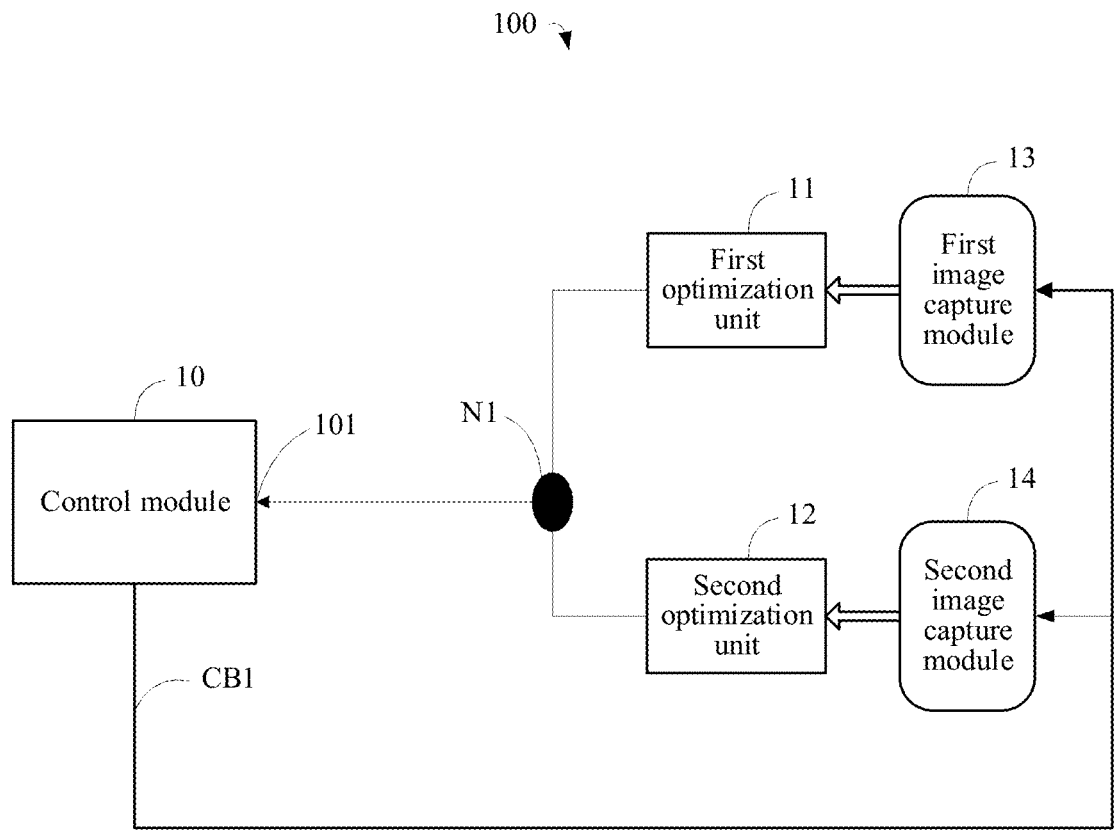
FIG. 3 is a schematic functional module diagram of an image capture switching control module according to a first embodiment of this application.

FIG. 3 is a schematic functional module diagram of an image capture switching control module 100 disposed in the image capture display terminal 1 shown in FIG. 1a and FIG. 1b and configured to perform image capture switching according to a first embodiment of this application. The image capture switching control module 100 is disposed inside the image capture display terminal 1.

In this embodiment, only the first image capture module 13 and the second image capture module 14 are electrically connected to a signal interface of the control module 10 by using the first node N1, that is, the first image capture module 13 and the second image capture module 14 share one signal interface corresponding to the first node N1, but the third image capture module 15 is electrically connected to the control module 10 directly, and is not required to be electrically connected to the control module 10 by using the first node N1 or share one signal interface with the first image capture module 13 and the second image capture module 14 to transmit an image signal to the control module 10.

As shown in FIG. 3, the image capture switching control module 100 includes a control module 10, a first optimization unit 11, a second optimization unit 12, a first image capture module 13, and a second image capture module 14. The control module 10 performs image capture switching control for the first image capture module 13 and the second image capture module 14. The control module 10 is electrically connected to the first image capture module 13 and the second image capture module 14 by using a first control bus CB1, to output a control signal to control the first image capture module 13 and the second image capture module 14 to be in a working state in a time-sharing manner. In addition, the first image capture module 13 is further electrically connected to a first signal interface 101 of the control module 10 by using the first optimization unit 11, and the second image capture module 14 is further electrically connected to the first signal interface 101 of the control module 10 by using the second optimization unit 12. The first image capture module 13 and the second image capture module 14 are in the working state in a time-sharing manner, so that the first signal interface 101 can be shared.

In this embodiment, the first control bus CB1 is a bus electrically connected between an interface of the control module 10 configured to output a control signal and the first image capture module 13 and the second image capture module 14. The first signal interface 101 is a CSI in an MIPI in the control module 10 configured to receive image data.

Specifically, the first image capture module 13 is configured to capture a first image and output a first image signal corresponding to the first image, that is, when the first image capture module 13 is in a working state, the first image is captured and converted into the first image signal. The first image signal includes image data corresponding to the first image and a clock signal, a synchronizing signal, and the like assisting in image data transmission and display. The second image capture module 14 is configured to capture a second image and output a second image signal corresponding to the second image, that is, when the second image capture module 14 is in a working state, the second image is captured and converted into the second image signal. The second image signal includes image data corresponding to the first image and a clock signal, a synchronizing signal, and the like assisting in image data transmission and display.

In this embodiment, the first image capture module 13 and the second image capture module 14 are cameras having different resolutions. The first image capture module 13 is a 2 megapixel (2 M resolution) camera, and the second image capture module 14 is an 8 megapixel (8 M resolution) camera. In other embodiments of this application, the first image capture module 13 and the second image capture module 14 may alternatively be cameras having the same resolution.

The control module 10 is electrically connected to the first image capture module 13 and the second image capture module 14 by using the first control bus CB1 separately, and the control module 10 controls, by using the control signal outputted by the first control bus CB1, the first image capture module 13 and the second image capture module 14 to work in a time-sharing manner.

In this embodiment, the control module 10 further includes another interface electrically connected to the first control bus CB1 directly. The first control bus CB1 is a bus cable configured to transmit an electrical signal. The electrical signal includes a control signal used for controlling working states of the first image capture module 13 and the second image capture module 14 and other signals. The electrical connection is connection performed by using conductive lines and can perform transmission of electrical signals. The conductive lines include PCB wires, flexible flat cables, conductive connectors, or other conductive physical cables.

The working states of the first image capture module 13 and the second image capture module 14 may be controlled as follows: The control module 10 receives input instructions provided by a user outside the image capture display terminal 1 by performing a touch operation on the touch display screen 1, or picking up a sound operation by using the audio pickup module VP, or other manners, or receives instructions provided by other functional module inside the terminal; and outputs a corresponding control signal to the first image capture module 13 and the second image capture module 14 by using the first control bus CB1. The control signal may control the working states of the first image capture module 13 and the second image capture module 14. The control signal may be a digital signal or an analog signal. The other functional modules may be a power supply module, an image processing module, and the like, and may certainly be other functional modules. This is not limited thereto.

The first optimization unit 11 is electrically connected between the first signal interface 101 and the first image capture module 13 by using the first node N1. The second optimization unit 12 is electrically connected between the first signal interface 101 and the second image capture module 14 by using the first node N1. That is, the first node N1 is used as a bifurcation point, and the first optimization unit 11 and the second optimization unit 12 are connected to the first signal interface 101 of the control module 10 by using the first node N1.

The first image signal is optimized by the first optimization unit 11 and then transmitted to the first signal interface 101 by using the first node N1, and at a different time, the second image signal is optimized by the second optimization unit 12 and then transmitted to the first signal interface 101 by using the first node N1. The control module 10 provides the optimized first image signal or the optimized second image signal to other modules separately, for example, provides to a display module (not shown) for display.

The optimization of the first optimization unit 11 on the first image signal and the optimization of the second optimization unit 12 on the second image signal specifically include:

When the first image capture module 13 is in the working state, the first image capture module 13 is in a high speed (HS) low resistance mode, and the first image signal corresponding to the captured first image is transmitted to the first signal interface 101 by using the first optimization unit 11. The first optimization unit 11 is configured to optimize the first image signal, to ensure the smoothness of a curve of the first image signal.

In addition, when the first image capture module 13 is in the working state, that is, when the first image capture module 13 is in a high speed low resistance mode, the second image capture module 14 is in the non-working state and in a low power (LP) high resistance mode, so as to stop capturing the second image.

In this embodiment, it should be noted that: when the first image capture module 13 and the second image capture module 14 are in an HS low resistance mode, that is, in the working state, each functional unit inside the first image capture module 13 and the second image capture module 14 is in a low resistance state, so as to capture an image and then convert image data into an image signal for output. When the first image capture module 13 and the second image capture module 14 are in an LP high resistance mode, that is, in the non-working state, each functional unit inside the first image capture module 13 and the second image capture module 14 is in a high resistance state, so as to stop capturing an image.

More specifically, the second image capture module 14 is in a non-LP high resistance mode, so that a conductive line and conductive components between the second image capture module 14 and the first node N1 have a certain impedance, which is equivalent to the wire stubs for the first image capture module 13. The existence of the wire stubs can easily lead to the generation of ringbacks at a rising edge and a falling edge of the curve of the first image signal. As a result, the curve of the first image signal is unsmooth. Because the first image signal having a ringback and an unsmooth curve is very easy to cause the control module 10 to be triggered by mistake and generate a data transmission error code, the first image capture module 13 is frozen, to further cause the image data corresponding to the first image to have errors and poor quality.

Similarly, the first image capture module 13 is in a non-LP high resistance mode, so that a conductive line and conductive components between the first image capture module 13 and the first node N1 have a certain impedance, which is equivalent to the wire stubs for the second image capture module 14. The existence of the wire stubs can easily lead to the generation of ringbacks at a rising edge and a falling edge of the curve of the second image signal, and the ringbacks cause the curve of the second image signal to be unsmooth. Because the second image signal having a ringback and an unsmooth curve is very easy to cause the control module 10 to be triggered by mistake and generate a data transmission error code, the second image capture module 14 is frozen, to further cause the image data corresponding to the second image to have errors and poor quality. The generation of the ringbacks at the rising edge and the falling edge in the image signal is that: the curve of the image signal shows a channel shape because of an instantaneous drop at the edges when the curve rises or drops gently and continuously at stages of the rising edge and the falling edge. Therefore, the existence of the ringback causes the curve of the image signal to be unsmooth.

In view of this, the first optimization unit 11 is electrically connected between the first node N1 and the first image capture module 13, and the smoothness of the curve of the first image signal is ensured by eliminating the ringback at the rising edge or falling edge in the second image signal, that is, by accurately eliminating the ringback caused by the wire stubs of the first node N1 and the second image capture module 14. A manner for the first optimization unit 11 to eliminate the ringback at the rising edge or falling edge in the first image signal may be that: pulling the instantaneous drops appearing at the rising edge and the falling edge of the curve of the image signal to a normal rising or falling position, that is, filling channels of the rising edge and the falling edge of the curve of the first image signal, so as to ensure the smoothness of the curve of the first image signal.

When the second image capture module 14 is in the working state, that is, when the second image capture module 14 is in an HS low resistance mode, the second image signal corresponding to the captured second image is transmitted to the first signal interface 101 by using the second optimization unit 12. The second optimization unit 12 is configured to optimize the second image signal, to ensure the smoothness of the curve of the second image signal. A manner for the second optimization unit 12 to eliminate the ringback at the rising edge or falling edge in the second image signal may be that: pulling the instantaneous drops appearing at the rising edge and the falling edge of the curve of the image signal to a normal rising or falling position, that is, filling channels of the rising edge and the falling edge of the curve of the second image signal, so as to ensure the smoothness of the curve of the second image signal. Certainly, there may alternatively be other manners to eliminate the ringback of the image signal, and this is not limited thereto.

In addition, when the second image capture module 14 is in the working state, that is, when the first image capture module 13 is in a high speed low resistance mode, the first image capture module 13 is in the non-working state and in an LP high resistance mode, so as to stop capturing the second image.

A manner for the second optimization unit 12 to ensure the smoothness of the curve of the second image signal specifically includes: eliminating the ringback at the rising edge or falling edge in the second image signal, that is, accurately eliminating the ringback caused by the wire stubs of the first node N1 and the first image capture module 13, to ensure the smoothness of the curve of the second image signal.

To further reduce the impact of the wire stubs, when the first image capture module 13 is in a low power high resistance mode, that is, when the first image capture module 13 is in the non-working state, an impedance of the first image capture module 13 is greater than 100Ω. Correspondingly, when the second image capture module 14 is in a low power high resistance mode, that is, when the second image capture module 14 is in the non-working state, an impedance of the second image capture module 14 is greater than 100Ω. Therefore, when the first image capture module 13 is in the non-working state, the impedance of the first image capture module can effectively prevent an interference signal from being transmitted to the second image capture module 14 in the working state. Similarly, when the second image capture module 14 is in the non-working state, the impedance of the second image capture module can effectively prevent an interference signal from being transmitted to the first image capture module 13 in the working state.

In this embodiment, connection lines between the first control bus CB1, the first optimization unit 11, the second optimization unit 12, and functional units are all arranged on a printed circuit board (PCB).

The control module 10 can directly control working states of the first image capture module 13 and the second image capture module 14 by using the first control bus CB1 shown in FIG. 3. In addition, a signal interface configured to receive image signals provided by different image capture modules is effectively saved by sharing the first signal interface 101, and there is completely no need to set an analog transfer switch circuit separately to control the working states of the first image capture module 13 and the second image capture module 14, so as to effectively reduce quantities of components and wires arranged on a circuit board, simplify a structure of the circuit board, and further provide more layout space for setting other functional components.

Figure 4:
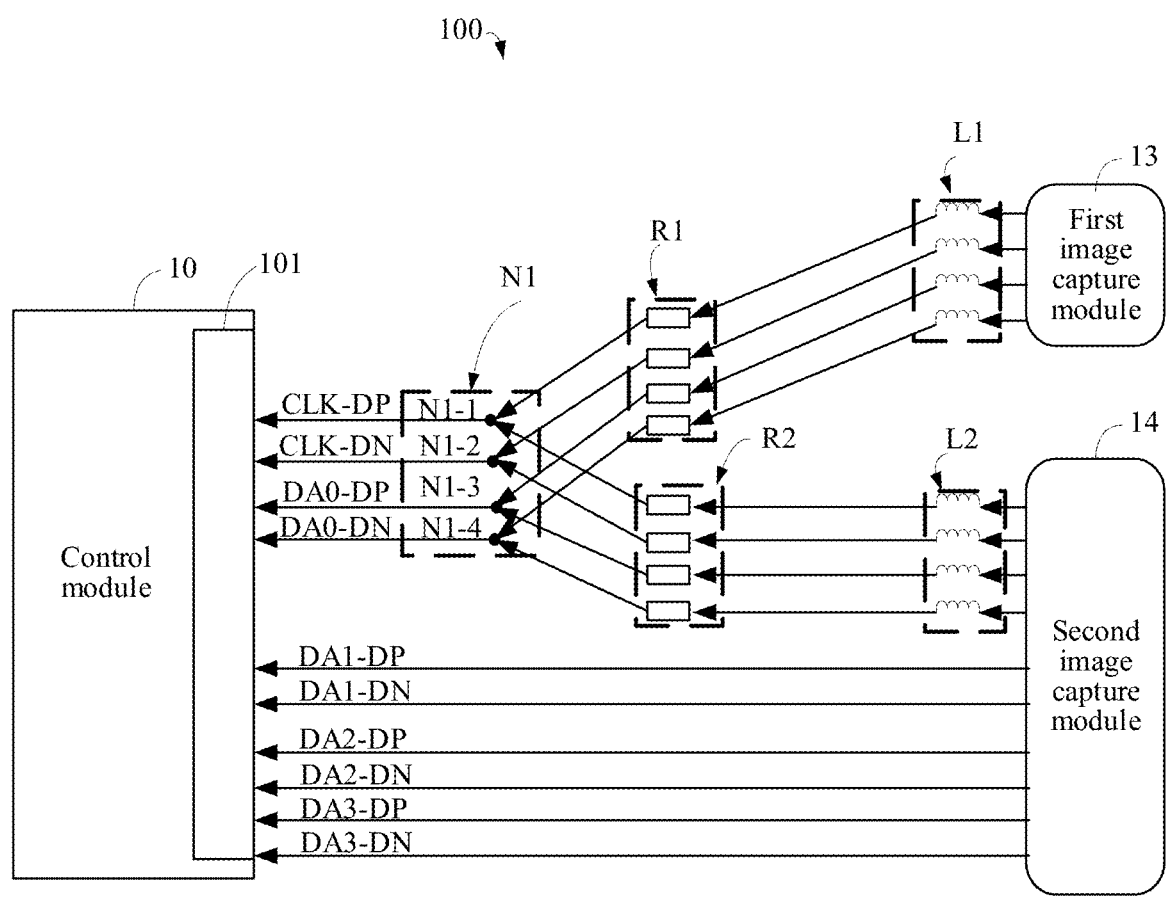
FIG. 4 is a schematic diagram of a specific circuit structure of the image capture switching control module shown in FIG. 3.

FIG. 4 is a schematic diagram of a specific circuit structure of the image capture switching control module shown in FIG. 3. As shown in FIG. 4, the first signal interface 101 in the control module 10 includes a clock signal interface CLK and a data signal interface DATA.

The clock signal interface CLK is configured to receive a clock control signal in the first image signal or the second image signal, and the data signal interface DATA is configured to receive image data in the first image signal or the second image signal. The control module 10 performs data processing according to a coordination between the clock control signal and the image data. The data processing refers to operations such as shift registering, compression, and transmission performed by the control module 10 on the image data according to clock signals and other control signals.

In this embodiment, the clock signal interface CLK includes a pair of clock differential pair interfaces, and the clock signal interface CLK specifically includes such two sub-clock signal ends as a first sub-clock end CLK-DP and a second sub-clock end CKL-DN.

The data signal interface DATA includes at least a pair of data differential pair interfaces, and the data signal interface DATA specifically includes such two sub-data ends as a first sub-data end DA0-DP and a second sub-data end DA0-DN.

A quantity of the data differential pair interfaces in the data signal interface DATA corresponds to the resolutions of the image capture modules. Specifically, for example, when the first image capture module 13 is a 2 megapixel camera, a quantity of the data differential pair interfaces in the data signal interface DATA is one, that is, the first sub-data end DA0-DP and the second sub-data end DA0-DN are required for data transmission. When the second image capture module 14 is an 8 megapixel camera, a quantity of the data differential pair interfaces in the data signal interface DATA is four, that is, the first sub-data end DA0-DP and the second sub-data end DA0-DN, a third sub-data end DA1-DP and a fourth sub-data end DA1-DN, a fifth sub-data end DA2-DP and a sixth sub-data end DA2-DN, and a seventh sub-data end DA3-DP and an eighth sub-data end DA3-DN are required for image data transmission.

In this embodiment, the first image capture module 13 and the second image capture module 14 are in the working state in a time-sharing manner and share the first signal interface 101, that is, the first image capture module 13 and the second image capture module 14 share one pair of clock differential pair interfaces in the clock signal interface CLK and one pair of data differential pair interfaces in the data signal interface DATA by using the first node N1. Specifically:

The first node N1 includes four child nodes N1-1 to N1-4 that are independent and insulated from each other. The four child nodes N1-1 to N1-4 are respectively electrically connected to the first sub-clock end CLK-DP, the second sub-clock end CKL-DN, the first sub-data end DA0-DP, and the second sub-data end DA0-DN correspondingly.

The first optimization unit 11 includes four first resistors R1 and four first inductors L1. One of the first resistors R1 and one of the first inductors L1 are serially connected to the four child nodes N1-1 to N1-4 in one-to-one correspondence. The second optimization unit 12 includes four second resistors R2 and four second inductors L3. One of the second resistors R2 and one of the second inductors L2 are serially connected to the four child nodes N1-1 to N1-4 in one-to-one correspondence.

Therefore, corresponding to the clock differential pair interface CLK and the data differential pair interface DATA, the four first resistors R1 and the four first inductors L1 are respectively electrically connected between the four child nodes N1-1 to N1-4 in the first node N1 and the first image capture module 13 in one-to-one correspondence, and the four second resistors R2 and the four second inductors L2 are respectively electrically connected between the four child nodes N1-1 to N1-4 in the first node N1 and the second image capture module 14 in one-to-one correspondence The first resistors R1 and the second resistors R2 are respectively configured to eliminate ringbacks of the first image signal and the second image signal at the rising edge or the falling edge, to ensure the smoothness of the curves of the first image signal and the second image signal. The first inductor L1 and the second inductor L2 are configured to further perform noise filtering on the first image signal and the second image signal. Therefore, through the coordination between the first resistor R1 and the first inductor L1 and the coordination between the second resistor R2 and the second inductor L2, the quality of the first image signal and the second image signal can be effectively improved to enable the first image capture module 13 to provide an image signal and perform high-speed, accurate, and complete transmission during working.

In this embodiment, a distance from the first node N1 to the control module 10 is greater than a distance from the first node N1 to the first image capture module 13, or the distance from the first node N1 to the control module 10 is greater than a distance from the first node N1 to the second image capture module 14. Certainly, the distance from the first node N1 to the control module 10 may alternatively be greater than distances from the first node N1 to the image capture modules 13 and 14. The distances from the first node N1 to the control module 10, the first image capture module 13, and the second image capture module 14 are lengths of conductive lines for signal transmission.

Therefore, compared with the control module 10, the first node N1 is disposed closer to the first image capture module 13 and the second image capture module 14. That is, the first node N1 is disposed in a position on a PCB as close to the first image capture module 13 and the second image capture module 14 as possible, so as to reduce a wiring distance between the first node N1 and the image capture module, to further reduce noise interference as far as possible. The first inductor L1 is disposed in a position close to a board to board (BTB) connection end of the first image capture module 13, and the second inductor L2 is disposed in a position close to a BTB connection end of the second image capture module 14. In this embodiment, the four first resistors R1 have the same resistance value, the four second resistors R2 have the same resistance value, and the four first resistors R1 and the four second resistors R2 have the same package size. When being disposed on the PCB, the four first resistors R1 and the four second resistors R2 are disposed close to each other and close to the first node N1, the four first inductors L1 are disposed close to the first image capture module 13, and the four second inductors L2 are disposed close to the second image capture module 14.

In other embodiments of this application, the distance from the first node N1 to the control module may alternatively be smaller than the distances from the first node N1 to the first image capture module 13 and the second image capture module 14. Correspondingly, the signal interference caused by a relatively long wiring distance may be reduced by adjusting the resistance values of the first resistors R1 and the second resistors R2.

Figure 5:
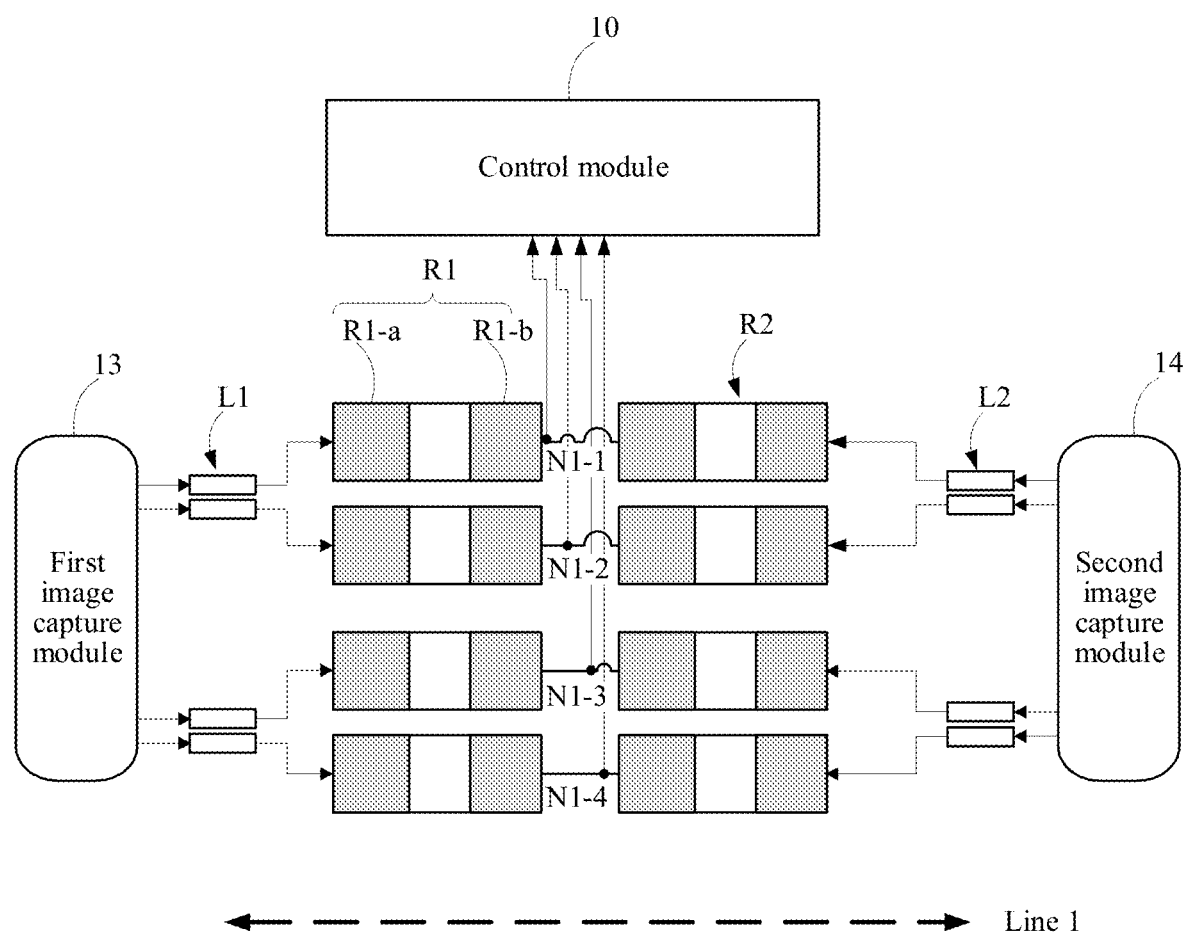
FIG. 5 is a schematic diagram of a connection structure in a first optimization unit and a second optimization unit shown in FIG. 4.

Specifically, FIG. 5 is a schematic diagram of a connection structure in the first optimization unit 11 and the second optimization unit 12 shown in FIG. 4.

As shown in FIG. 5, any one of the first resistors R1 includes a first connection end R1-*a* and a second connection end R1-*b*. Certainly, correspondingly, any one of the second resistors R2 includes a first connection end (not labeled) and a second connection end (not labeled).

In a specific connection process of the first optimization unit 11 and the second optimization unit 12, the second connection end R1-*b* of the first resistor R1 is connected to the first node N1, and the second connection end of the second resistor R2 is also connected to the first node N1. The first connection end R1-*a* of the first resistor R1 is electrically connected to one end of the first inductor L1, and another end of the first inductor L1 is electrically connected to the first image capture module 13. The second connection end of the second resistor R2 is electrically connected to one end of the second inductor L2, and another end of the second inductor L2 is electrically connected to the second image capture module 14.

In this embodiment, when being disposed on the PCB, the first resistors R1, the second resistors R2, the first inductors L1, and the second inductors L2 are disposed on a surface of the PCB by using a surface mount technology (SMT) or other packaging technologies.

In this embodiment, the four first resistors R1 and the four second resistors R2 are all disposed close to the first image capture module 13 and the second image capture module 14, and the first image capture module 13 and the second image capture module 14 are arranged abreast on a straight line parallel to a first straight line Line1. In addition, the four child nodes N1-1 to N1-4 in the first node N1 are also located on the straight line parallel to the first straight line Line1. The first straight line Line1 is parallel to the control module 10. Certainly, in other alternative embodiments, the four child nodes N1-1 to N1-4 in the first node N1 may be located at any position between the first straight line Line1 and the first control module 13.

Figure 6:
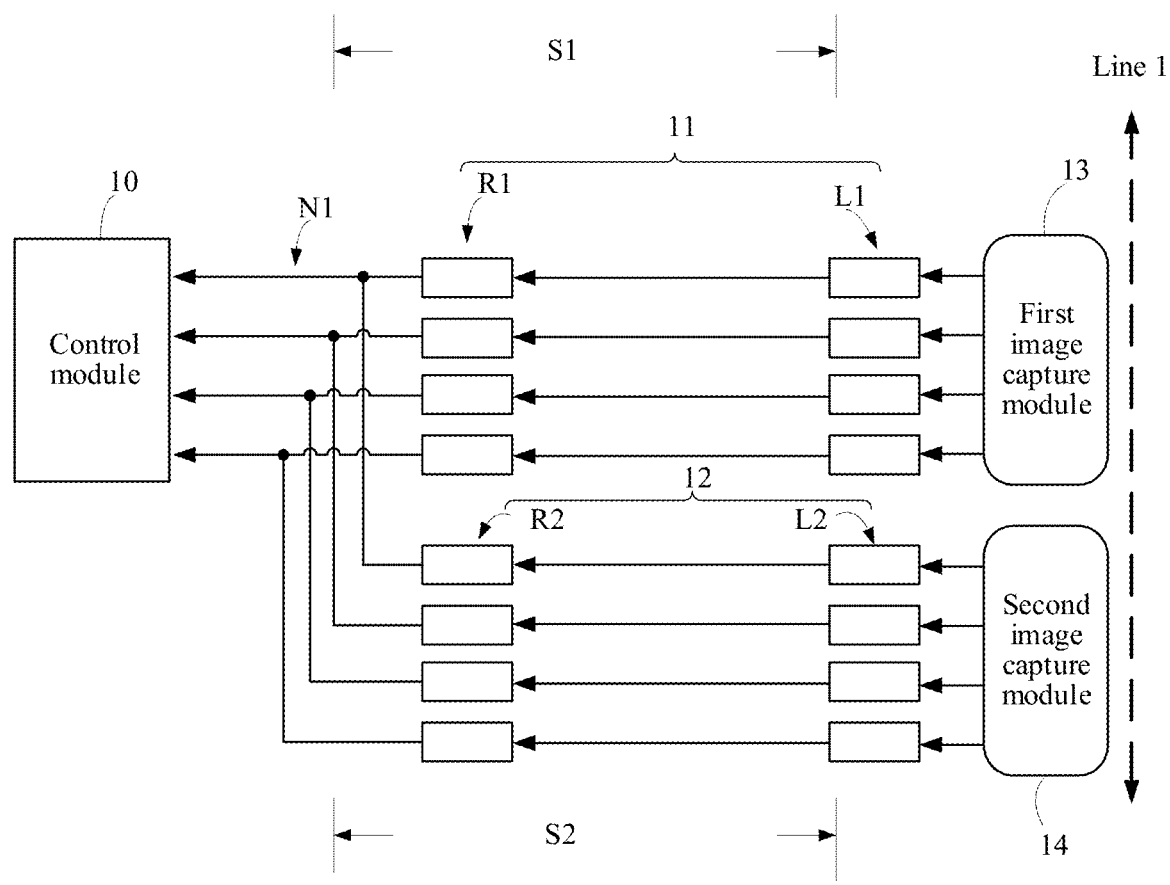
FIG. 6 is a schematic diagram of a plane layout structure of a first optimization unit and a second optimization unit shown in FIG. 4.

FIG. 6 is a schematic diagram of a plane layout structure of the first optimization unit 11 and the second optimization unit 12 shown in FIG. 4. As shown in FIG. 6, as for the first optimization unit 11, the first node N1 is separated from the first image capture module 13 by a first distance S1, and because the four first resistors R1 are disposed close to the first node N1 and the four first inductors L1 are disposed close to the first image capture module 13, correspondingly, the four first resistors R1 are approximately separated from the first image capture module 13 by the first distance S1.

As for the second optimization unit 12, the first node N1 is separated from the second image capture module 14 by a second distance S2, and because the four second resistors R2 are disposed close to the first node N1 and the four second inductors L2 are disposed close to the second image capture module 14, correspondingly, the four second resistors R2 are approximately separated from the second image capture module 14 by the second distance S2.

In this embodiment, the first distance S1 is the same as the second distance S2, the first resistors R1 and the second resistors R2 have the same resistance value, and correspondingly, the first inductors L1 and the second inductors L2 have the same inductance value.

When the first distance S1 and the second distance S2 are the same and are both 10 mm, the resistance values of the first resistors R1 and the second resistors R2 are the same and are all 10Ω, and the inductance values of the first inductors L1 and the second inductors L2 are 27 nH. In this embodiment, the resistance values of the first resistors R1 and the second resistors R2 and the inductance values of the first inductors L1 and the second inductors L2 may all be adjusted according to actual requirements, and for example, may be adjusted according to factors such as the first distance S1, the second distance S2, and parameters of the first image capture module 13 and the second image capture module 14. This is not limited thereto.

Figure 7:
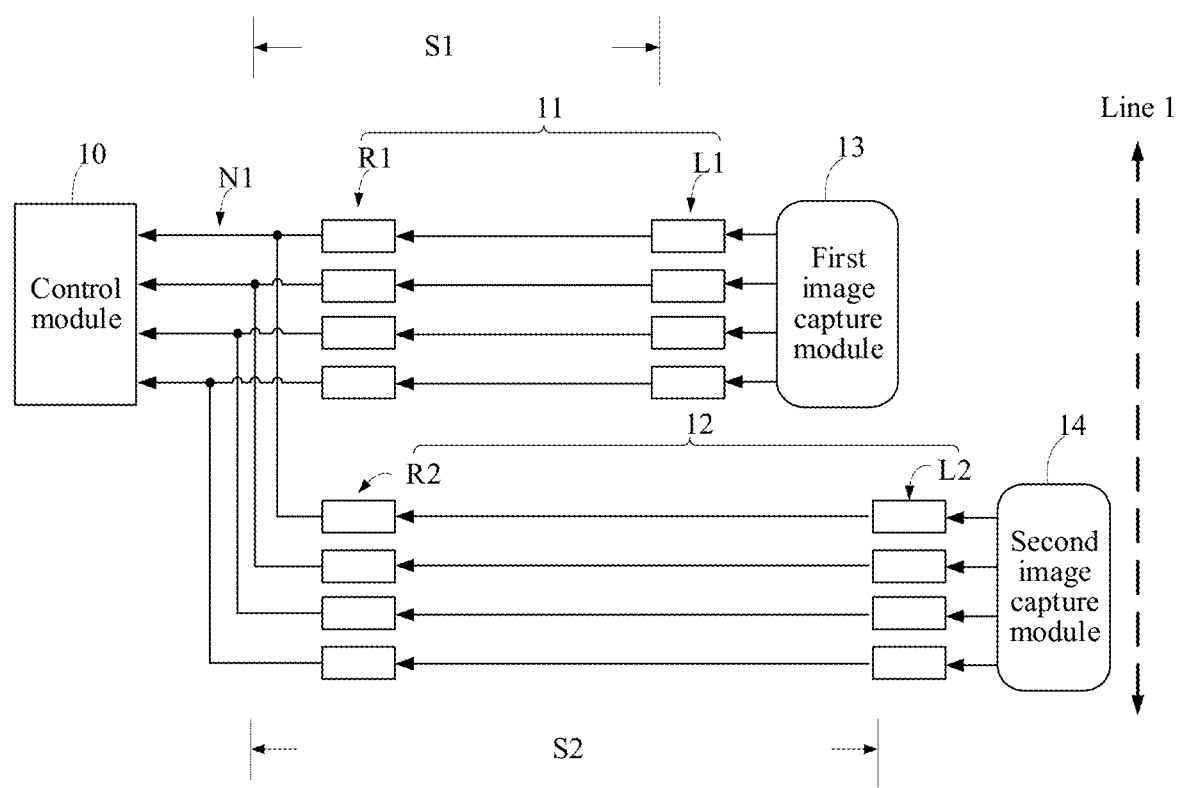
FIG. 7 is a schematic diagram of a plane layout structure of a first optimization unit and a second optimization unit shown in FIG. 4 according to a second embodiment of this application.

FIG. 7 is a schematic diagram of a plane layout structure of the first optimization unit 11 and the second optimization unit 12 shown in FIG. 4 according to a second embodiment of this application. As shown in FIG. 7:

as for the first optimization unit 11, the first node N1 is separated from the first image capture module 13 by the first distance S1.

As for the second optimization unit 12, the first node N1 is separated from the second image capture module 14 by the second distance S2.

In this embodiment, the first distance S1 is different from the second distance S2, the first resistors R1 and the second resistors R2 have the same resistance value, but the first inductors L1 and the second inductors L2 have different inductance values.

When the first distance S1 is 10 mm and the second distance S2 is 35 mm, the resistance values of the first resistors R1 and the second resistors R2 are the same and are 22Ω, the first inductors L1 are 27 nH, and the inductance values of the second inductors L2 are 15 nH. In this embodiment, the resistance values of the first resistors R1 and the second resistors R2 and the inductance values of the first inductors L1 and the second inductors L2 may all be adjusted according to actual requirements, and for example, may be adjusted according to factors such as the first distance S1, the second distance S2, and parameters of the first image capture module 13 and the second image capture module 14. This is not limited thereto.

Figure 8:
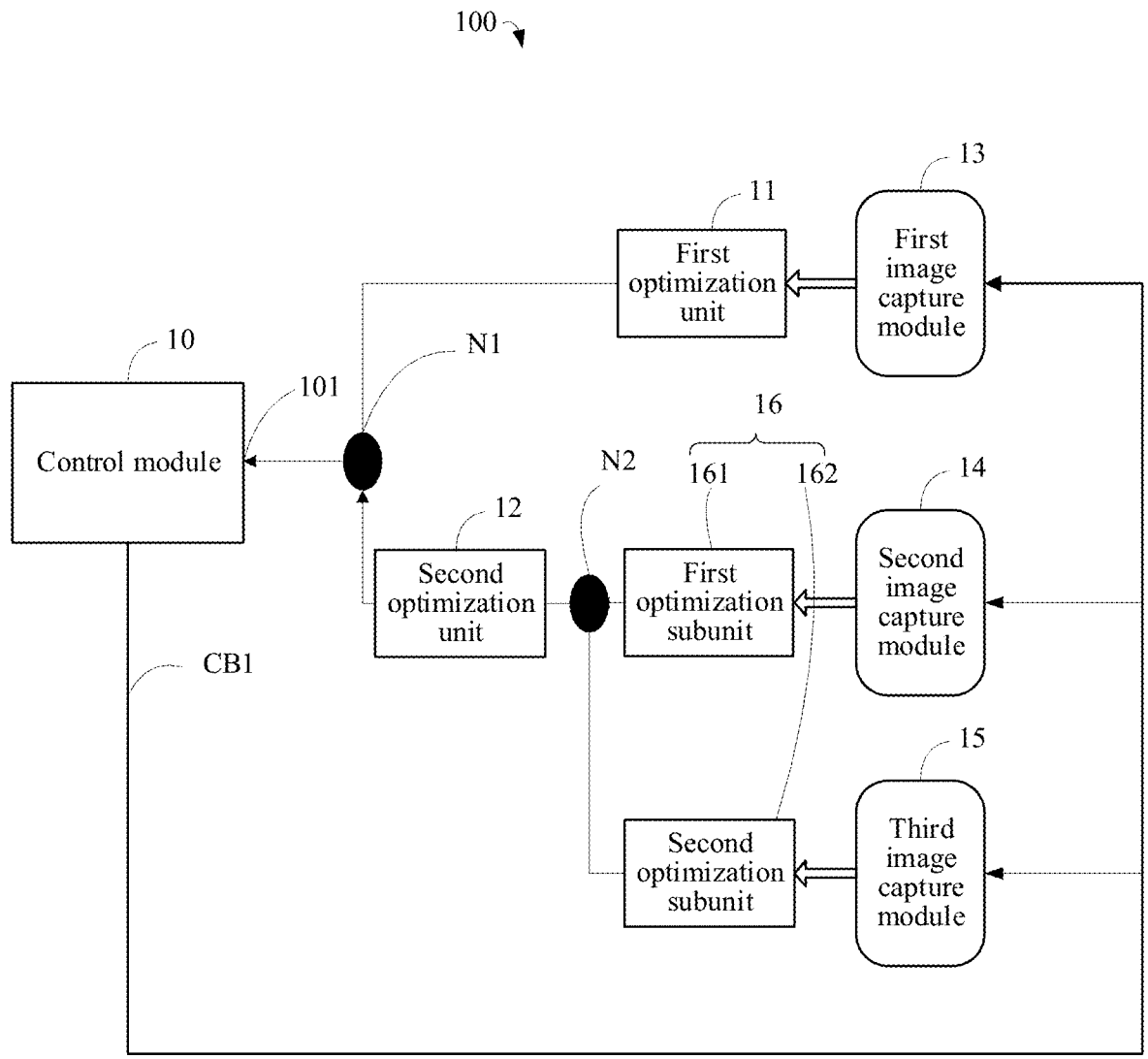
FIG. 8 is a schematic functional module diagram of an image capture switching control module according to a third embodiment of this application.

Further, FIG. 8 is a schematic functional module diagram of an image capture switching control module according to a third embodiment of this application. As shown in FIG. 8, the image capture switching control module 100 includes a first image capture module 13, a second image capture module 14, and a third image capture module 15, and is configured to perform switching control on the first image capture module 13, the second image capture module 14, and the third image capture module 15. In addition, the image capture switching control module 100 further includes a first node N1, a second node N2, a first optimization unit 11, a second optimization unit 12, and a third optimization unit 16. In this embodiment, the first image capture module 13 and the second image capture module 14 work in the same working principle, working manner, and functions as those recorded in the first embodiment and the second embodiment. The third image capture module 15 is configured to capture a third image and output a second image signal corresponding to the third image. When the third image capture module 15 is in a working state, that is, in a high speed low resistance mode, the third image capture module 15 is configured to capture the third image and output the corresponding third image signal. When the third image capture module 15 is in a non-working state, that is, in a low power high resistance mode, the third image capture module stops capturing the third image, and has an impedance greater than 100Ω.

The resolution of the third image capture module 15 is the same as the resolution of the second image capture module 14. It should be noted that, the first image capture module 13, the second image capture module 14, and the third image capture module 15 share a first signal interface 101. Therefore, regardless of what image capture mode the image capture display terminal 1 is in, at the same moment, only one of the first image capture module 13, the second image capture module 14, and the third image capture module 15 is in the working state.

The third image capture module 15 is electrically connected to a control module 10 by using a first control bus CB1, and the control module 10 controls the first image capture module 13, the second image capture module 14, and the third image capture module 15 to be in the working state in a time-sharing manner. That is, when the first image capture module 13 is in the working state, the second image capture module 14 and the third image capture module 15 are in the non-working state. When the second image capture module 14 is in the working state, the first image capture module 13 and the third image capture module 15 are in the non-working state. When the third image capture module 15 is in the working state, the first image capture module 13 and the second image capture module 14 are in the non-working state.

The first optimization unit 11 is electrically connected between the first node N1 and the first image capture module 13, and the second optimization unit 12 is electrically connected between the first node N1 and the second node N2.

The second image module 14 is electrically connected to the second node N2 by using the third optimization unit 16, and the third image capture module 15 is electrically connected to the second node N2 by using the third optimization unit 16.

When the second image capture module 14 or the third image capture module 15 is in the working state, the second optimization unit 12 and the third optimization unit 16 are activated simultaneously to coordinate with each other to eliminate ringbacks of the second image signal and the third image signal at rising edges and falling edges, to ensure the smoothness of curves of the image signals.

Figure 9:
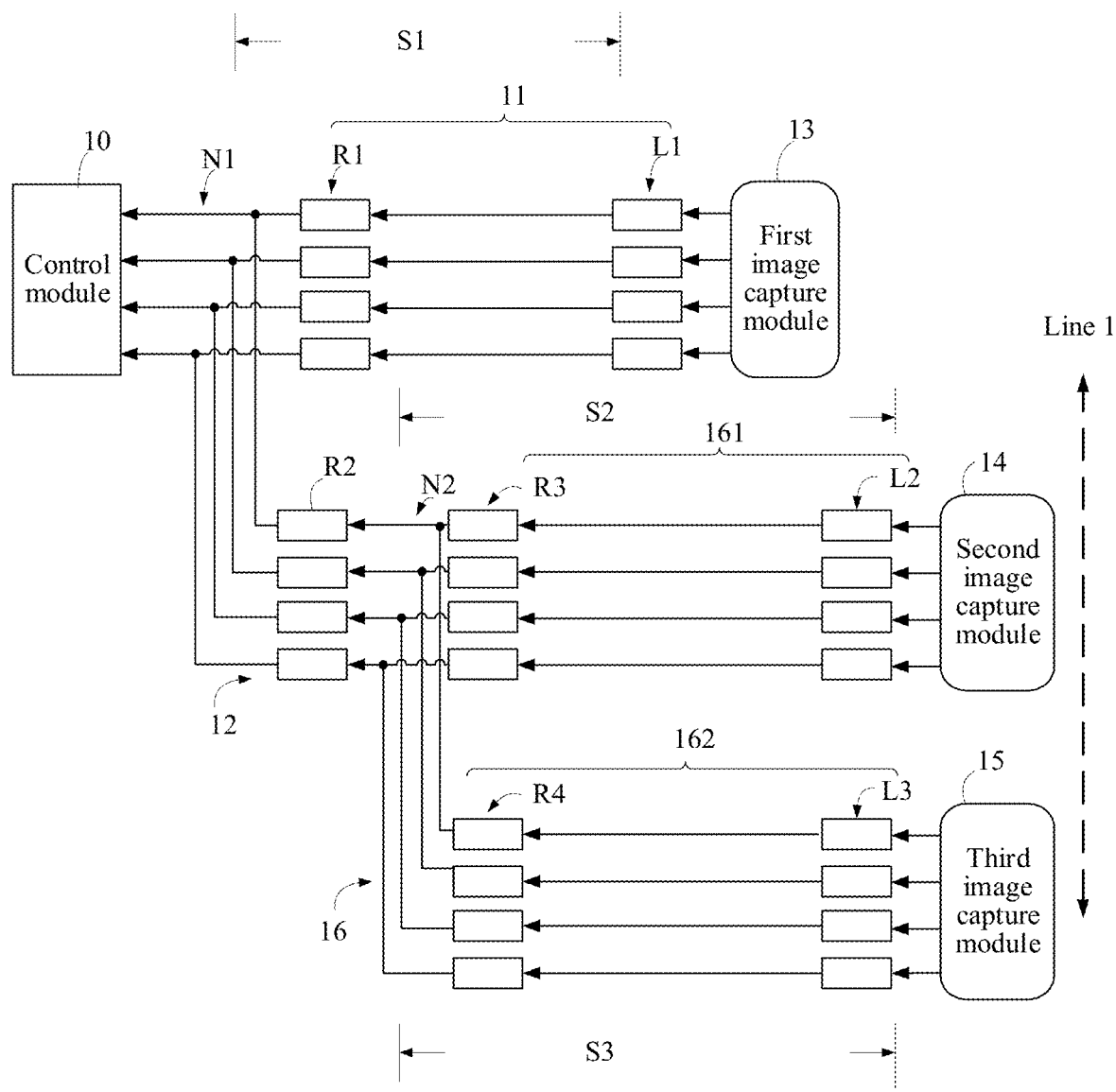
FIG. 9 is a schematic diagram of a plane layout structure of a first optimization unit and a second optimization unit shown in FIG. 8.

Specifically, referring to FIG. 8 and FIG. 9 together, FIG. 9 is a schematic diagram of a plane layout structure of the first optimization unit 11, the second optimization unit 12, and the third optimization unit 16 shown in FIG. 8. As shown in FIG. 9, the third optimization unit 16 includes a first optimization subunit 161 and a second optimization subunit 162, the second image capture module 14 is electrically connected to the second node N2 by using the first optimization subunit 161, and the third image capture module 15 is electrically connected to the second node N2 by using the second optimization subunit 162.

The second optimization unit 12 and the first optimization subunit 161 are activated simultaneously to coordinate with each other to eliminate the ringback of the second image signal at the rising edge or falling edge, to ensure the smoothness of the curve of the second image signal. The second optimization unit 12 and the second optimization subunit 162 are activated simultaneously to coordinate with each other to eliminate the ringback of the third image signal at the rising edge or falling edge, to ensure the smoothness of the curve of the third image signal.

In this embodiment, the first optimization unit 11 includes four first resistors R1 and four first inductors L1, the second optimization unit 12 includes four second resistors R2, the first optimization subunit 161 includes four third resistors R3 and second inductors L2, and the second optimization subunit 162 includes fourth resistors R4 and third inductors L3. The first node N1 is separated from the first image capture module 13 by a first distance S1, the second node N2 is separated from the second image capture module 14 by a second distance S2, and the second node N2 is separated from the third image capture module 15 by a third distance S3. In this embodiment, the second node N2 also includes four child nodes (not labeled) that are independent of each other and insulated from each other, and the four child nodes in the second node N2 are in one-to-one correspondence to the four child nodes N1-1 to N1-4 in the first node N1 respectively.

Because the four second resistors R2 and the four third resistors R3 are disposed close to the second node N2, the four second inductors L2 are disposed close to the second image capture module 14, and the four third inductors L3 are disposed close to the third image capture module 15, correspondingly, the four second resistors R2 and the four third resistors R3 are separated from the second image capture module 14 by the second distance S2, and the four second resistors R2 and the four fourth resistors R4 are separated from the third image capture module 15 by the third distance S3.

In this embodiment, the first distance S1 is different from the second distance S2, and the second distance S2 is the same as the third distance S3.

The resistance values of the first resistors R1 and the second resistors R2 are the same, the resistance values of the second resistors R2 and the third resistors R3 are different, and the resistance values of the third resistors R3 and the fourth resistors R4 are the same. The inductance values of the first inductors L1 and the second inductors L2 are different, and the inductance values of the second inductors L2 and the third inductors L3 are the same.

When the first distance S1 is 10 mm and the second distance S2 is 35 mm, the resistance values of the first resistors R1 and the second resistors R2 are the same and are all 22Ω, the resistance values of the third resistors R3 and the fourth resistors R4 are all 10Ω, the inductance values of the first inductors L1 are 18 nH, and the inductance values of the second inductors L2 and the third inductors L3 are 9 nH.

The resistance values of the third resistors R3 and the fourth resistors R4 may be adjusted according to actual situations. For example, the resistance values of the third resistors R3 and the fourth resistors R4 may be adjusted according to factors such as the first distance S1 and the second distance S2, and an adjustment range of the resistance values of the third resistors R3 and the fourth resistors R4 is from 0Ω to x Ω, x being a numerical value greater than 0.

Figure 10:
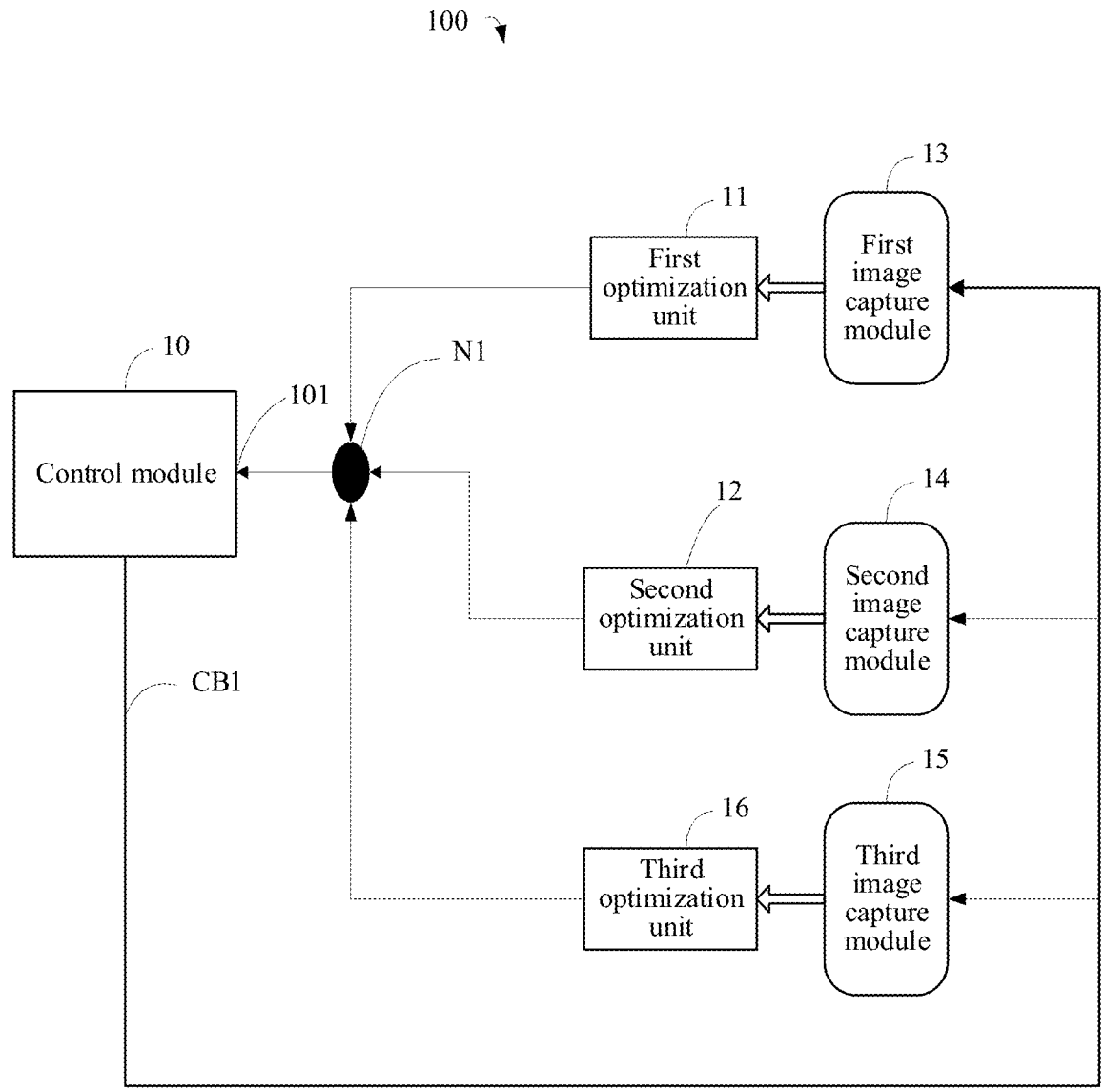
FIG. 10 is a schematic functional module diagram of an image capture switching control module according to a fourth embodiment of this application.

Further, FIG. 10 is a schematic functional module diagram of an image capture switching control module according to a fourth embodiment of this application. As shown in FIG. 10, circuit structures of the image capture switching control module 100 and the image capture switching control module 100 in the third embodiment are basically the same, and merely different in that the image capture switching control module 100 further includes a third image capture module 15 and a third optimization unit 16.

Specifically, the image capture switching control module 100 includes a first image capture module 13, a second image capture module 14, and the third image capture module 15, and is configured to perform switching control on the first image capture module 13, the second image capture module 14, and the third image capture module 15, and further includes a first node N1, a first optimization unit 11, a second optimization unit 12, and the third optimization unit 16.

In this embodiment, the first image capture module 13 and the second image capture module 14 have the same functions as those recorded in the first embodiment and the second embodiment. When the third image capture module 15 is in a working state, that is, in a high speed low resistance mode, the third image capture module 15 is configured to capture a third image and output a corresponding third image signal. When the third image capture module 15 is in a non-working state, that is, in a low power high resistance mode, the third image capture module stops capturing the third image, and has an impedance greater than 100Ω. The resolution of the third image capture module 15 is the same as the resolution of the second image capture module 14.

It should be noted that, the first image capture module 13, the second image capture module 14, and the third image capture module 15 share a first signal interface 101. Therefore, regardless of what image capture mode the image capture display terminal 1 is in, at the same moment, only one of the first image capture module 13, the second image capture module 14, and the third image capture module 15 is in the working state.

The third image capture module 15 is electrically connected to a control module 10 by using a first control bus CB1, and the control module 10 controls the first image capture module 13, the second image capture module 14, and the third image capture module 15 to be in the working state in a time-sharing manner. That is, when the first image capture module 13 is in the working state, the second image capture module 14 and the third image capture module 15 are in the non-working state. When the second image capture module 14 is in the working state, the first image capture module 13 and the third image capture module 15 are in the non-working state. When the third image capture module 15 is in the working state, the first image capture module 13 and the second image capture module 14 are in the non-working state.

The first optimization unit 11 is electrically connected between the first node N1 and the first image capture module 13, the second optimization unit 12 is electrically connected between the first node N1 and the second image capture module 14, and the third optimization unit 16 is electrically connected between the first node N1 and the third image capture module 15. In this embodiment, circuit structures, connection manners, and working time sequences of the first optimization unit 11 and the second optimization unit 12 are totally the same as circuit structures, connection manners, and working time sequences of the first optimization unit 11 and the second optimization unit 12 in the first embodiment. Further, circuit structures and working principles of the third optimization unit 16, the first optimization unit 11, and the second optimization unit 12 are the same.

When the third image capture module 15 is in the working state, the third optimization unit 16 eliminates ringbacks of the third image signal at a rising edge and a falling edge, to ensure the smoothness of a curve of the image signal.

Figure 11:
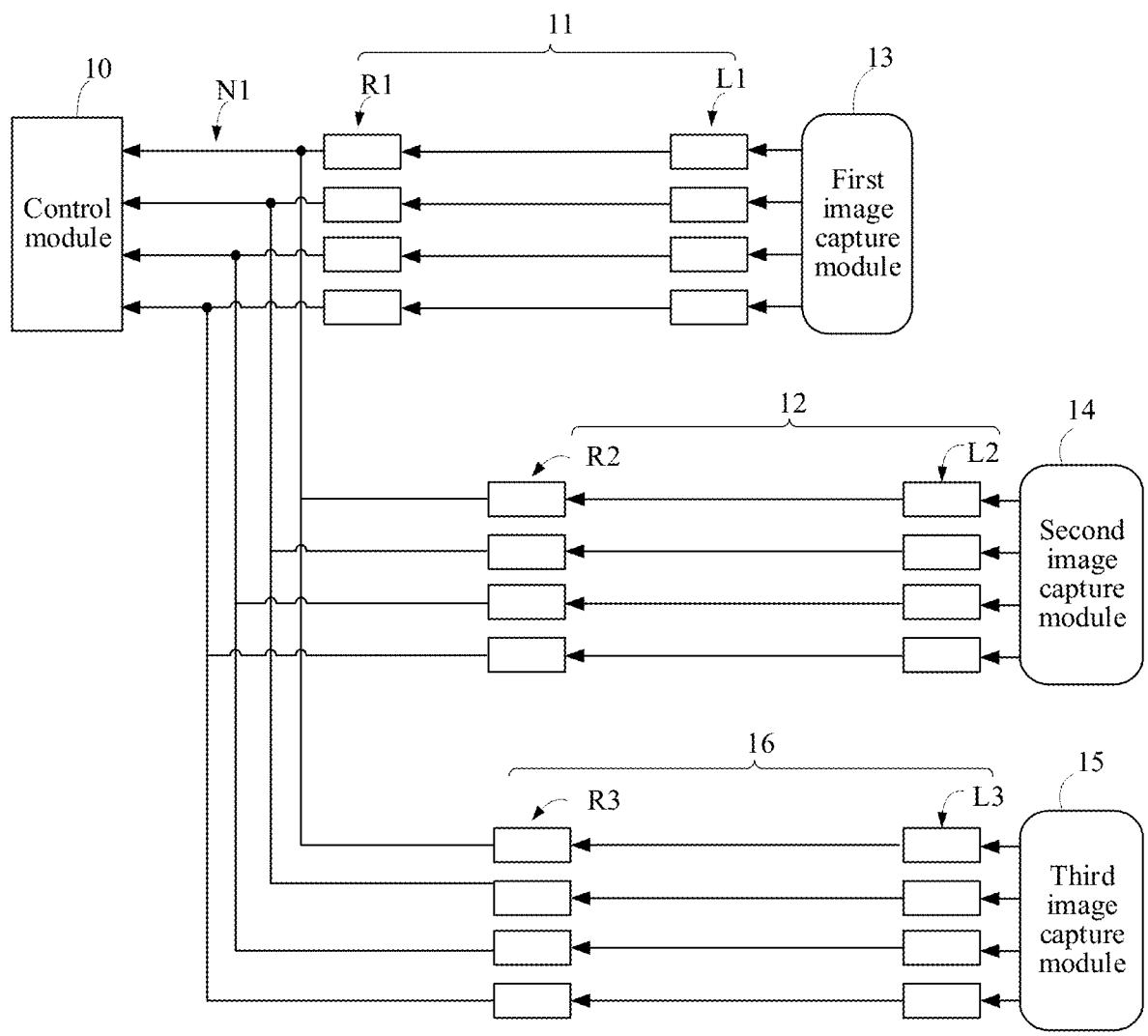
FIG. 11 is a schematic diagram of a plane layout structure of a first optimization unit and a second optimization unit shown in FIG. 10.

Specifically, referring to FIG. 10 and FIG. 11 together, FIG. 11 is a schematic diagram of a plane layout structure of the first optimization unit 11, the second optimization unit 12, and the third optimization unit 16 shown in FIG. 10. As shown in FIG. 11, the first optimization unit 11 includes four first resistors R1 and four first inductors L1, the second optimization unit 12 includes four second resistors R2 and four second inductors L2, and the third optimization unit 16 includes four third resistors R3 and four third inductors L3. One of the third resistors R3 and one of the third inductors L3 are serially connected between the four child nodes N1-1 to N1-4 and the third image capture module 15 in one-to-one correspondence.

Figure 12:
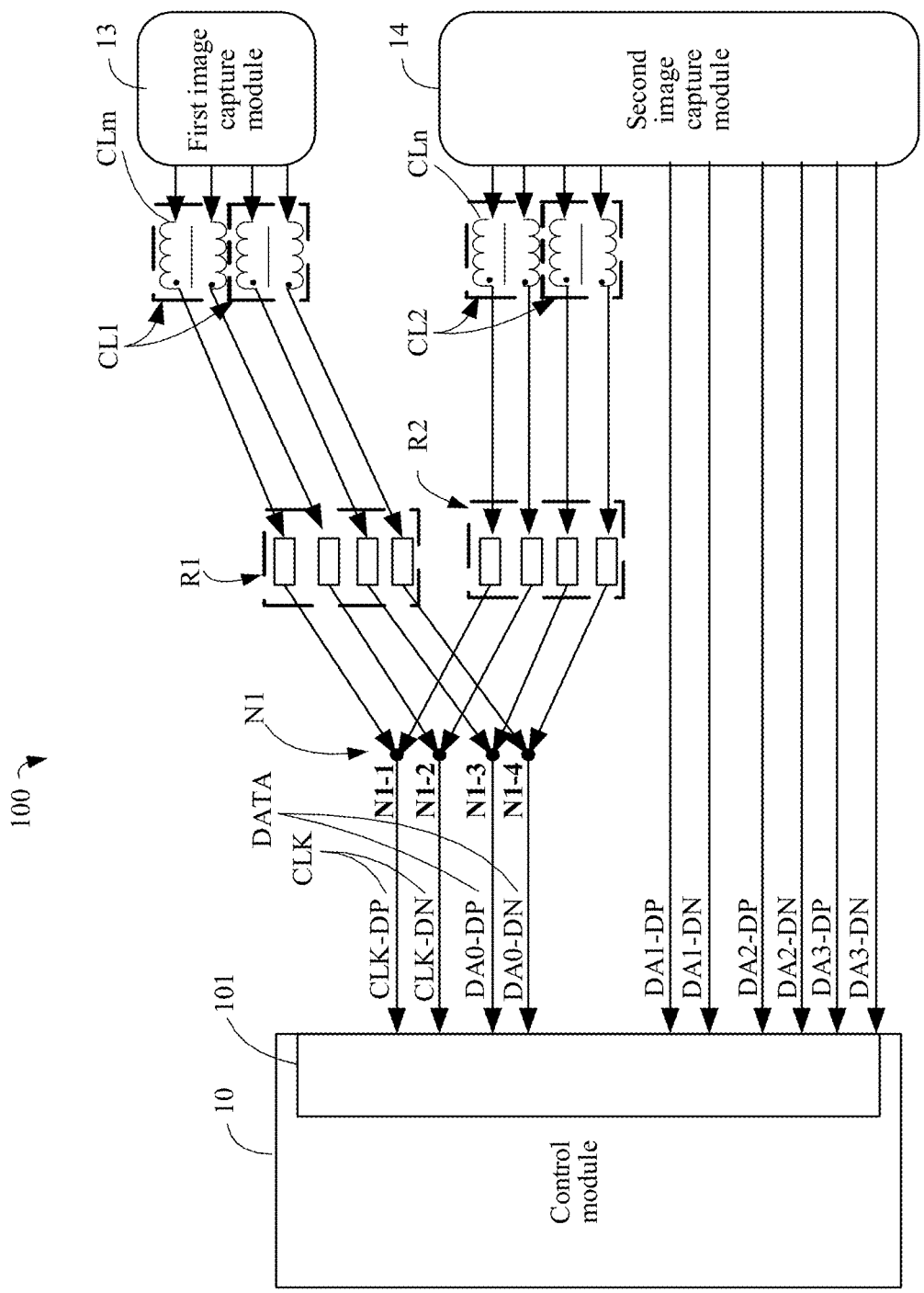
FIG. 12 is a schematic diagram of a specific circuit structure of the image capture switching control module shown in FIG. 3 according to a fifth embodiment of this application.

FIG. 12 is a schematic diagram of a specific circuit structure of the image capture switching control module shown in FIG. 3 according to a fifth embodiment of this application. In this embodiment, as shown in FIG. 12, the image capture switching control module 100 and the image capture switching control module 100 shown in FIG. 4 are basically the same, and different in that the four first inductors L1 in the first optimization unit 11 are replaced with two common-mode inductors CL1, and the four second inductors L2 are replaced with two common-mode inductors CL2. In addition to having the same effect of eliminating noise of image signals as the first inductors L1 and the second inductors L2, the first common-mode inductors CL1 and the second common-mode inductors CL2 have higher integration levels than those of the dispersive and independent first inductors L1 and second inductors L2. Therefore, the assembly is simpler and more convenient and the safety protection performance is better.

As shown in FIG. 12, the first optimization unit 11 includes four first resistors R1 and two first common-mode inductors CL1. Each first common-mode inductor includes two first sub-inductors CLm. One of the first resistors R1 is serially connected to one of the first sub-inductors CLm. Therefore, one of the first common-mode inductors CL1 is serially connected to two of the first resistors R1. Correspondingly, the second optimization unit 12 includes four second resistors R2 and two second common-mode inductors CL2, and each second common-mode inductor includes two second sub-inductors CLn. One of the first resistors R1 is serially connected to one of the second sub-inductors CLn. Therefore, one of the first common-mode inductors CL1 is serially connected to two of the first resistors R1.

That is, the two adjacent first inductors L1 corresponding to one differential pair interface in the first embodiment and the second embodiment are replaced with one first common-mode inductor CL1 in this embodiment, and the two adjacent second inductors L2 corresponding to one differential pair interface in the first embodiment and the second embodiment are replaced with one second common-mode inductor CL2 in this embodiment.

In addition, corresponding to the clock differential pair interface, two of the first resistors R1 and one first common-mode inductor CL1 are serially and electrically connected between the first node N1 and the first image capture module 13, and two of the second resistors R2 and one second common-mode inductor CL2 are serially and electrically connected between the first node N1 and the second image capture module 14.

Corresponding to the data differential pair interface, the other two of the first resistors R1 and the other first common-mode inductor CL1 are serially and electrically connected between the first node N1 and the first image capture module 13, and the other two of the second resistors R2 and the other second common-mode inductor CL2 are serially and electrically connected between the first node N1 and the second image capture module 14.

The first common-mode inductor CL1 is configured to further perform noise filtering on the first image signal. Therefore, through the coordination between the first resistors R1 and the first common-mode inductor CL1, the quality of the first image signal can be effectively improved to enable the first image capture module 13 to provide an image signal and perform high-speed, accurate, and complete transmission during working.

Correspondingly, the second common-mode inductor CL2 is configured to further perform noise filtering on the second image signal. Therefore, through the coordination between the second resistors R2 and the second common-mode inductor CL2, the quality of the second image signal can be effectively improved to enable the second image capture module 14 to provide an image signal and perform high-speed, accurate, and complete transmission during working.

Figure 13:
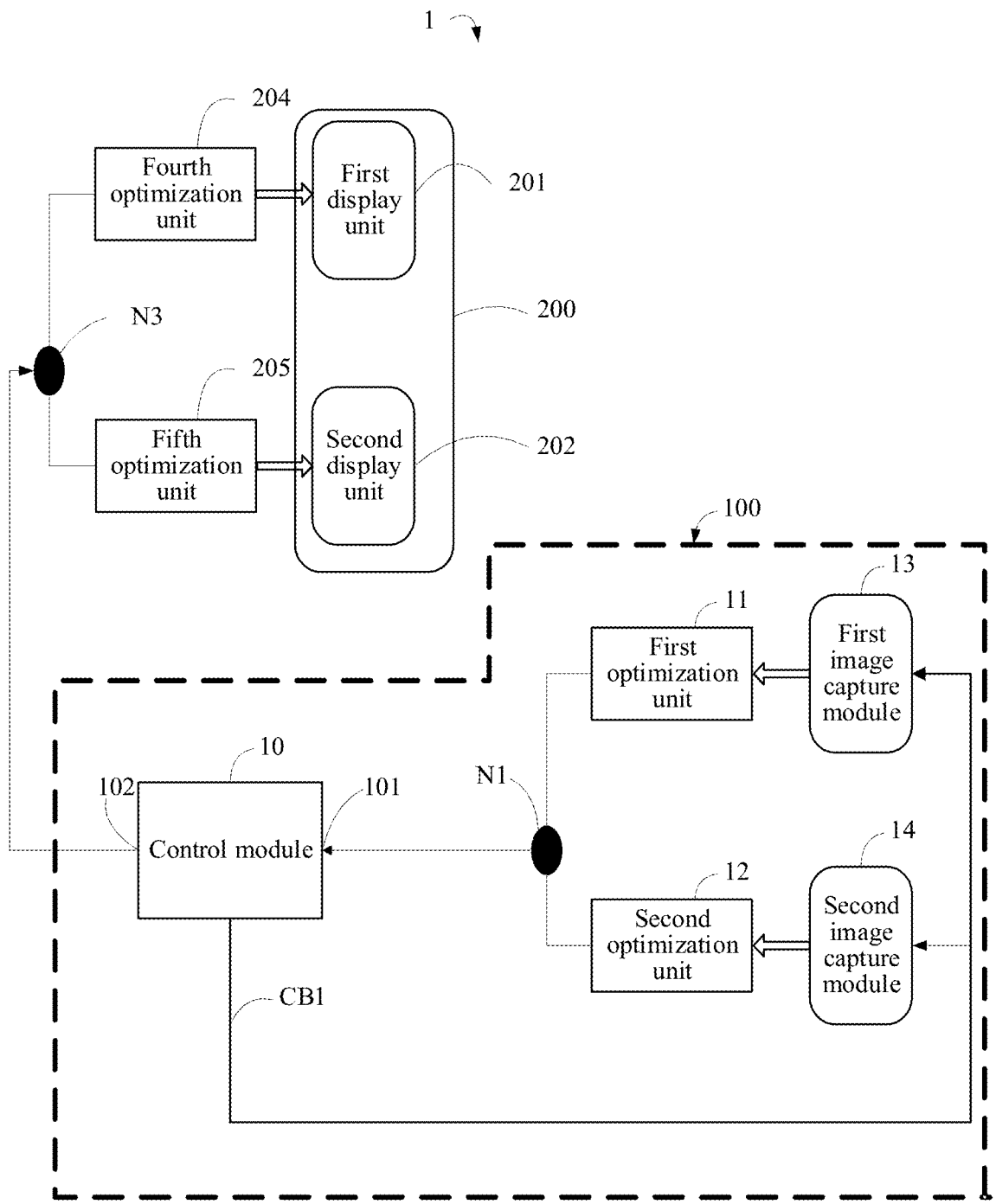
FIG. 13 is a schematic diagram of a functional structure of an image capture display terminal according to a sixth embodiment of this application.
Figure 14A:
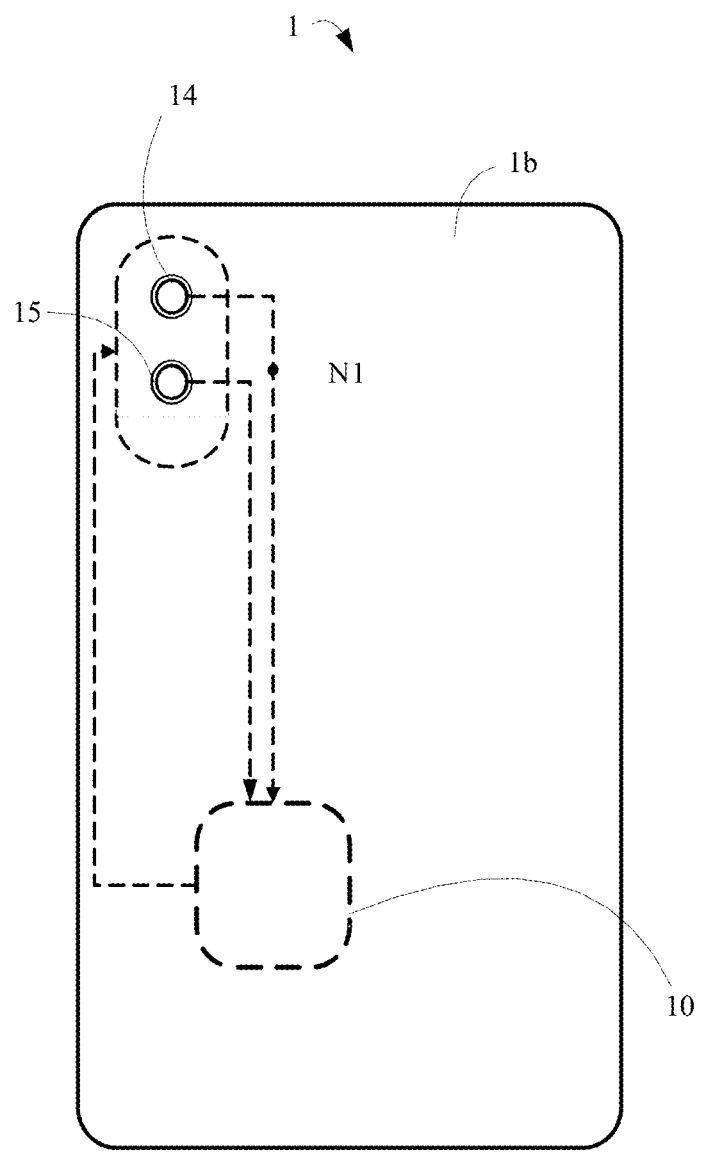
FIG. 14a and FIG. 14b are schematic diagrams of plane structures of two opposite sides of the image capture display terminal shown in FIG. 13.
Figure 14B:
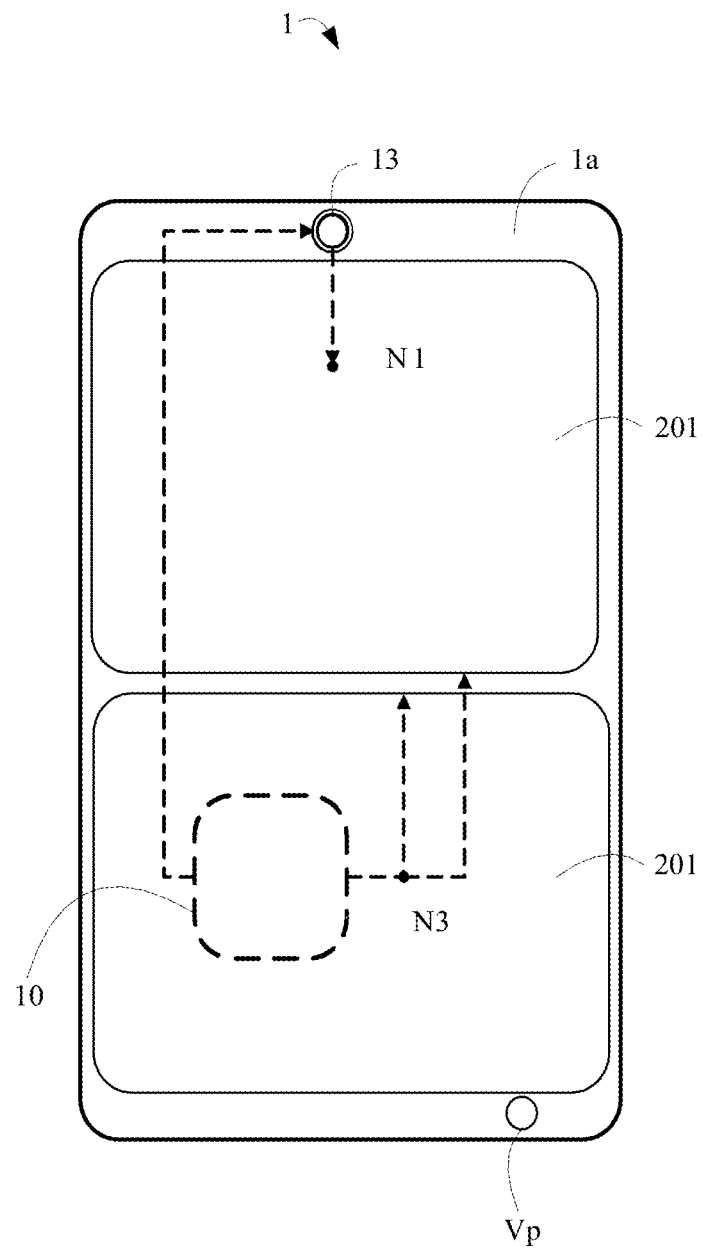

Referring to FIG. 13, FIG. 14a, and FIG. 14b together, FIG. 13 is a schematic diagram of a functional structure of an image capture display terminal 1 according to a sixth embodiment of this application. FIG. 14a and FIG. 14b are schematic diagrams of plane structures of two opposite sides of the image capture display terminal 1 shown in FIG. 13.

As shown in FIG. 13, FIG. 14a, and FIG. 14b, the image capture display terminal 1 includes a display module 200 and an image capture switching control module 100. The image capture switching control module 100 described in this embodiment has the same structure and function as those of the image capture switching control module 100 shown in FIG. 3. As shown in FIG. 13, the image capture switching control module 100 includes a control module 10, a first optimization unit 11, a second optimization unit 12, a first image capture module 13, and a second image capture module 14. Differences lie in that the image capture display terminal 1 further includes the display module 200, and a fourth optimization unit 204 and a fifth optimization unit 205 configured to optimize image data received by the display module 200 for display.

Specifically, the display module 200 is configured to receive an image signal and display the image signal. As shown in FIG. 14a and FIG. 14b, the display module 200 includes a first display unit 201 and a second display unit 202 disposed on a touch display screen 1a. Both the first display unit 201 and the second display unit 202 are configured to perform image display according to an image signal. Image display resolutions of the first display unit 201 and the second display unit 202 may be the same or different.

In this embodiment, a quantity of display units included in the display module 200 may alternatively be set as required, for example, the display module may include three or more display units, and this is not limited thereto. The image signal may be from a first image signal, a second image signal, and a third image signal provided by the first image capture module 13, the second image capture module 14, and a third image capture module 15, or may be from an image generated inside the display terminal or an image signal received by another terminal.

Specifically, the control module 10 further includes a second signal interface 102, a second control bus CB2, and a third node N3. The second signal interface is a display serial interface (DSI) in a mobile industry processor interface MIPI.

The control module 10 is electrically connected to the first display unit 201 and the second display unit 202 by using the second control bus CB2, and outputs a control signal to the first display unit 201 and the second display unit 202 by using the second control bus CB2, to control whether the first display unit 201 and the second display unit 202 receive an image signal and perform image display. In addition, the first display unit 201 and the second display unit 202 are further electrically connected to the second signal interface 102 of the control module 10 by using the third node N3, and the control module 10 provides an image signal to the first display unit 201 and the second display unit 20 by using the second signal interface 102 in a time-sharing manner.

That the control module 10 provides an image signal to the first display unit 201 and the second display unit 202 in a time-sharing manner includes that:

When the first display unit 201 receives the image signal by using the second signal interface 102, the second display unit 202 does not receive the image signal. Otherwise, when the first display unit 201 does not receive the image signal, the second display unit 202 receives the image signal by using the second signal interface 102. The first display unit 201 and the second display unit 201 receive the image signal in a time-sharing manner, so that the first display unit and the second display unit may share the second signal interface 102 to receive the image signal.

The control module 10 may control both the first display unit 201 and the second display unit 202 to be in a state of waiting for receiving an image signal at the same time by using the control signal.

In addition, to control a time for the first display unit 201 and the second display unit 202 to perform image display and correct receiving of the image signal as required after the image signal is received, the control module 10 further outputs the corresponding control signal to the first display unit 201 and the second display unit 202, to control the first display unit 201 to be in a state of waiting for receiving an image signal or control the second display unit 202 to be in a state of waiting for receiving an image signal. When the first display unit 201 is in the state of waiting for receiving an image signal, the first display unit 201 receives an image signal from the second signal interface 102, and when the second display unit 202 is in the state of waiting for receiving an image signal, the second display unit 202 receives an image signal from the second signal interface 102.

A scenario in which the first display unit 201 and the second display unit 202 need to be in the state of waiting for receiving an image signal in a time-sharing manner is that: when the user needs to display an image in a screen split manner because the display module 200 is folded, or needs to display images captured at different positions or captured by different image capture modules on different display units, the user may trigger the control module 10 to control the first display unit 201 and the second display unit 202 to be in the state of waiting for receiving an image signal in a time-sharing manner by folding or unfolding the touch display screen TP or by using a touch operation.

Specifically, the user enables, by using a touch operation, the control module 10 to receive instructions inputted by a user outside the image capture display terminal 1, namely, input instructions provided by performing the touch operation on the information prompt box displayed on the touch display screen 1a shown in FIG. 2, or picking up an audio signal in a sound by using the audio pickup module VP, or other manners, or to receive instructions provided by other functional modules inside the terminal. The position information corresponding to the touch operation is used for representing a display unit selected to perform image display. For example, when a position of an upper-screen display option in the touch display screen TP is operated by the user, it represents that the first display unit 201 is selected to receive an image signal; and when a position of a lower-screen display option in the touch display screen TP is operated by the user, it represents that the second display unit 202 is selected to receive an image signal.

The audio signal may also be used for representing a display unit selected to receive an image signal. For example, if content included in voice information in the audio signal is recognized to be "upper-screen display", it represents that the first display unit 201 is selected to receive an image signal; and if content included in voice information in the audio signal is recognized to be "lower-screen display", it represents that the second display unit 202 is selected to receive an image signal.

It should be noted that, although the first display unit 201 and the second display unit 202 receive an image signal in a time-sharing manner, the first display unit 201 and the second display unit 202 may perform image display at the same time, or only one of the two display units that has received an image signal performs image display. This is not limited thereto. For example, the first display unit 201 and the second display unit 202 may display an image signal at the same time by temporarily storing the received image signal, or only one of the first display unit 201 and the second display unit 202 may display the received image signal.

As shown in FIG. 13, the fourth optimization unit 204 is electrically connected to the second signal interface 102 by using the third node N3, and the fourth optimization unit 204 is further electrically connected to the first display unit 201. The fifth optimization unit 205 is electrically connected to the second signal interface 102 by using the third node N3, and the fifth optimization unit 205 is further electrically connected to the second display unit 202. The fourth optimization unit 204 and the fifth optimization unit 205 are connected to the second signal interface 102 of the control module 10 by using the third node N3 used as a bifurcation point.

In this embodiment, circuit structures and connection layout manners of the fourth optimization unit 204 and the fifth optimization unit 205 are the same as circuit structures and connection layout manners of the first optimization unit 11 and the second optimization unit 12, which is not described in this embodiment again. Correspondingly, a principle and a process of optimization of the fourth optimization unit 204 on the first image signal and optimization of the fifth optimization unit 205 on the second image signal are the same as a principle and a process of optimization of the first optimization unit 11 on the first image signal and optimization of the second optimization unit 12 on the second image signal.

When the first display unit 201 receives an image signal by using the second signal interface 102 and the third node N3, the fourth optimization unit 204 can accurately eliminate ringbacks and noise of the image signal generated at the rising edge or the falling edge caused by the wire stubs of the third node N3 and the second display unit 202, to ensure the smoothness of a curve of the image signal. When the second display unit 202 receives an image signal by using the second signal interface 102 and the third node N3, the fifth optimization unit 205 can accurately eliminate ringbacks and noise of the image signal generated at the rising edge or the falling edge caused by the wire stubs of the third node N3 and the first image display module 201, to ensure the smoothness of a curve of the image signal. Therefore, the fourth optimization unit 204 and the fifth optimization unit 205 can cause curves of received image signals to be smooth. For example, when the first display unit 201 and the second display unit 202 receive the first image signal and the second image signal, a curve of the received first image signal or second image signal is caused to be smooth.

The foregoing descriptions are exemplary embodiments of the present invention. It should be noted that a person of ordinary skill in the art may make certain improvements and polishing without departing from the principle of the present invention and the improvements and polishing shall fall within the protection scope of the present invention.

What is claimed is:

1. An image capture display terminal, comprising: a control module, a first optimization unit, a second optimization unit, a first image capture module, a second image capture module, and a first node, wherein
    the control module comprises a first control bus and a first signal interface, the control module is electrically connected to the first image capture module and the second image capture module by using the first control bus, and the control module outputs a control signal to control the first image capture module and the second image capture module to be in a working state in a time-sharing manner;
    the first signal interface is electrically connected to the first node;
    the first optimization unit is electrically connected between the first node and the first image capture module, wherein the first optimization unit comprises first resistors;
    the second optimization unit is electrically connected between the first node and the second image capture module, wherein the second optimization unit comprises second resistors;
    the first image capture module is configured to capture a first image and output a first image signal;
    the second image capture module is configured to capture a second image and output a second image signal;
    the captured first image signal is transmitted to the first signal interface by using the first optimization unit when the first image capture module is in the working state, and the first optimization unit is configured to ensure the smoothness of a curve of the first image signal; and
    the captured second image signal is transmitted to the first signal interface by using the second optimization unit when the second image capture module is in the working state, and the second optimization unit is configured to ensure the smoothness of a curve of the second image signal.

2. The image capture display terminal according to claim 1, wherein
the first optimization unit is specifically configured to eliminate, when the first image capture module is in the working state and the second image capture module is in a non-working state, a ringback of the first image signal to ensure the smoothness of the curve of the first image signal; and
the second optimization unit is specifically configured to eliminate, when the second image capture module is in the working state and the first image capture module is in the non-working state, a ringback of the second image signal to ensure the smoothness of the curve of the second image signal.

3. The image capture display terminal according to claim 1, wherein
a distance from the first node to the control module is greater than a distance from the first node to the first image capture module; or
a distance from the first node to the control module is greater than a distance from the first node to the second image capture module.

4. The image capture display terminal according to claim 3, wherein
the first optimization unit further comprises first inductors, and the first inductors are serially connected between the first resistors and the first image capture module;
the second optimization unit further comprises second inductors, and the second inductors are serially connected between the second resistors and the second image capture module;
the first inductors are configured to filter noise of the first image signal; and
the second inductors are configured to filter noise of the second image signal.

5. The image capture display terminal according to claim 4, wherein
the first signal interface comprises a clock signal interface and a data signal interface, the clock signal interface is configured to receive a clock control signal in the first image signal or the second image signal, and the data signal interface is configured to receive image data in the first image signal or the second image signal;
the clock signal interface comprises a pair of clock differential pair interfaces, and the pair of clock differential pair interfaces is electrically connected to the first node;
the data signal interface comprises a pair of data differential pair interfaces, and the pair of data differential interfaces is electrically connected to the first node;
the first optimization unit comprises four first resistors, and the four first resistors are electrically connected between the first node and the first image capture module respectively corresponding to the clock differential pair interfaces and the data differential pair interfaces; and
the second optimization unit comprises four second resistors, and the four second resistors are electrically connected between the first node and the second image capture module respectively corresponding to the clock differential pair interfaces and the data differential pair interfaces.

6. The image capture display terminal according to claim 5, wherein
the first optimization unit specifically further comprises four first inductors, and the four first inductors are electrically connected between the four first resistors and the first image capture module respectively; and
the second optimization unit specifically further comprises four second inductors, and the four second inductors are electrically connected between the four second resistors and the second image capture module respectively.

7. The image capture display terminal according to claim 5, wherein
the first optimization unit further comprises two first common-mode inductors, each of the first common-mode inductors comprises two first sub-inductors, and one of the first resistors is serially connected to one of the first sub-inductors;
the second optimization unit further comprises two second common-mode inductors, each of the second common-mode inductors comprises two second sub-inductors, and one of the first resistors is serially connected to one of the second sub-inductors;
two of the first resistors and one of the first common-mode inductors are serially connected, and electrically connected between the first node and the first image capture module corresponding to the clock differential pair interfaces, and two of the second resistors and one of the second common-mode inductors are serially connected, and electrically connected between the first node and the second image capture module corresponding to the clock differential pair interfaces; and
the other two of the first resistors and the other one of the first common-mode inductors are serially connected, and electrically connected between the first node and the first image capture module corresponding to the data differential pair interfaces, and the other two of the second resistors and the other one of the second common-mode inductors are serially connected, and electrically connected between the first node and the second image capture module corresponding to the data differential pair interfaces.

8. The image capture display terminal according to claim 1, wherein
the image capture switching control module further comprises a third image capture module, a second node, and a third optimization unit,
the third image capture module is electrically connected to the control module by using the first control bus and configured to capture a third image to obtain a third image signal, and the control module is further configured to control the first image capture module, the second image capture module, and the third image capture module to be in the working state in the time-sharing manner;
the second optimization unit is electrically connected between the first node and the second node;
the second image capture module is electrically connected to the second node by using the third optimization unit;
the third image capture module is electrically connected to the second node by using the third optimization unit;
the second optimization unit and the third optimization unit are configured to eliminate the ringback and noise of the second image signal to ensure the smoothness of the curve of the second image signal; and
the second optimization unit and the third optimization unit are configured to eliminate a ringback and noise of the third image signal to ensure the smoothness of a curve of the third image signal.

9. The image capture display terminal according to claim 8, wherein the third optimization unit comprises a first optimization subunit and a second optimization subunit, the second image capture module is electrically connected to the second node by using the first optimization subunit, and the third image capture module is electrically connected to the second node by using the second optimization subunit;

the second optimization unit and the first optimization subunit are configured to eliminate the ringback and the noise of the second image signal; and the second optimization unit and the second optimization subunit are configured to eliminate the ringback and the noise of the third image signal.

10. The image capture display terminal according to claim 9, wherein the second resistors are electrically connected between the first node and the second node;

the first optimization subunit comprises third resistors and second inductors, and the third resistors and the second inductors are serially connected between the second node and the second image capture module; and the second optimization subunit comprises fourth resistors and third inductors, and the fourth resistors and the third inductors are serially connected between the second node and the third image capture module.

11. The image capture display terminal according to claim 10, wherein the clock signal interface is further configured to receive a clock control signal in the third image signal, and the data signal interface is further configured to receive image data in the third image signal;

the clock signal interface comprises a pair of clock differential pair interfaces, and the pair of clock differential pair interfaces is electrically connected to the first node;

the data signal interface comprises a pair of data differential pair interfaces, and the pair of data differential interfaces is electrically connected to the first node;

the first optimization unit comprises four first resistors and four first inductors, and the four first resistors and the four first inductors are serially and electrically connected between the first node and the first image capture module respectively in one-to-one correspondence corresponding to the pair of clock differential pair interfaces and the pair of data differential pair interfaces;

the second optimization unit comprises four second resistors, and the four second resistors are serially and electrically connected between the first node and the second node corresponding to the pair of clock differential pair interfaces and the pair of data differential pair interfaces;

the first optimization subunit comprises four third resistors and four second inductors, and the four third resistors and the four second inductors are serially and electrically connected between the second node and the second image capture module respectively in one-to-one correspondence corresponding to the pair of clock differential pair interfaces and the pair of data differential pair interfaces; and the second optimization subunit comprises four fourth resistors and four third inductors, and the four fourth resistors and the four third inductors are serially and electrically connected between the second node and the third image capture module respectively in one-to-one correspondence corresponding to the pair of clock differential pair interfaces and the pair of data differential pair interfaces.

12. The image capture display terminal according claim 1, wherein the image capture display terminal further comprises a display module, and the control module further comprises a second signal interface, a second control bus, and a third node;

the third node is electrically connected to the second signal interface;

the display module comprises a first display unit and a second display unit, the first display unit and the second display unit are configured to perform image display, and the first display unit and the second display unit are electrically connected to the second signal interface by using the second node; and the control module is electrically connected to the first display unit and the second display unit by using the second control bus, and the control module transmits an image signal to the first display unit and the second display unit by using the second signal interface in a time-sharing manner.

13. The image capture display terminal according to claim 12, further comprising a fourth optimization unit and a fifth optimization unit, wherein the fourth optimization unit is electrically connected between the third node and the first display unit and configured to eliminate a ringback and noise of a received image signal; and the fifth optimization unit is electrically connected between the third node and the second display unit and configured to eliminate a ringback and noise of a received image signal.

14. The image capture display terminal according to claim 13, wherein the control module is a system on chip, the first signal interface is a camera serial interface in a mobile industry processor interface, and the second signal interface is a display serial interface in the mobile industry processor interface.

15. An image capture display terminal, comprising: a control module, a first optimization unit, a second optimization unit, a first image capture module, a second image capture module, and a first node, wherein the control module comprises a first control bus and a first signal interface, the control module is electrically connected to the first image capture module and the second image capture module by using the first control bus, and the control module outputs a control signal to control the first image capture module and the second image capture module to be in a working state in a time-sharing manner;

the first signal interface comprises a clock signal interface and a data signal interface, the clock signal interface is configured to receive a clock control signal in a first image signal or a second image signal, and the data signal interface is configured to receive image data in the first image signal or the second image signal, the clock signal interface comprises a pair of clock differential pair interfaces, and the data signal interface comprises a pair of data differential pair interfaces;

the pair of clock differential pair interfaces and the pair of data differential pair interfaces in the first signal interface are electrically connected to four child nodes in the first node respectively;

the first optimization unit is electrically connected between the first node and the first image capture module, and the first optimization unit comprises four first resistors and four first inductors;

the second optimization unit is electrically connected between the first node and the second image capture module, and the second optimization unit comprises four second resistors and four second inductors;

the four first resistors are electrically connected between the four child nodes and the first image capture module respectively corresponding to the clock differential pair interfaces and the data differential pair interfaces;

the four second resistors are electrically connected between the four child nodes and the second image capture module respectively corresponding to the clock differential pair interfaces and the data differential pair interfaces;

the first image capture module is configured to capture a first image and output a first image signal;

the second image capture module is configured to capture a second image and output a second image signal;

the first image signal is transmitted to the first signal interface by using the first optimization unit when the first image capture module is in the working state, the first resistor is configured to eliminate a ringback of the first image signal, and the first inductor is configured to filter noise of the first image signal; and the second image signal is transmitted to the first signal interface by using the second optimization unit when the second image capture module is in the working state, the second resistor is configured to eliminate a ringback of the second image signal, and the second inductor is configured to filter noise of the second image signal.

* * * * *

UNITED STATES PATENT AND TRADEMARK OFFICE
CERTIFICATE OF CORRECTION

PATENT NO. : 11,711,627 B2
APPLICATION NO. : 17/628175
DATED : July 25, 2023
INVENTOR(S) : Kaikai Song et al.

It is certified that error appears in the above-identified patent and that said Letters Patent is hereby corrected as shown below:

On the Title Page

In item (71) Applicant, before "Guangdong" insert -- Shenzhen --.

Signed and Sealed this
Twenty-third Day of January, 2024

Katherine Kelly Vidal
*Director of the United States Patent and Trademark Office*